United States Patent [19]

Arbogast, Jr. et al.

[11] Patent Number: 4,649,636

[45] Date of Patent: Mar. 17, 1987

[54] WIRE DEPLOYING APPARATUS AND METHOD OF USING

[75] Inventors: William C. Arbogast, Jr., Mechanicsburg; Andrew G. Boutcher, Jr.; Kenneth F. Folk, both of Harrisburg; Stephen D. Richart, Hummelstown; Milton D. Ross, Harrisburg, all of Pa.

[73] Assignee: AMP Incorporated, Harrisburg, Pa.

[21] Appl. No.: 784,276

[22] Filed: Oct. 4, 1985

[51] Int. Cl.[4] ........................ H01R 43/04; B23P 19/00

[52] U.S. Cl. ........................................ 29/861; 29/749; 29/753; 81/9.51

[58] Field of Search ................. 29/749, 788, 753, 861, 29/33 M, 863, 33 F, 755; 81/9.51

[56] References Cited

U.S. PATENT DOCUMENTS 4,017,954 4/1977 Grubb .................................. 29/749
4,091,531 5/1978 Grubb et al. .......................... 29/749
4,351,110 9/1982 Folk .................................. 29/753 X
4,495,682 1/1985 Matsui et al. ...................... 29/33 M
4,534,098 8/1985 Brown et al. ...................... 29/749 X

*Primary Examiner*—Mark Rosenbaum
*Assistant Examiner*—Carl J. Arbes
*Attorney, Agent, or Firm*—Thomas G. Terrell

[57] ABSTRACT

Apparatus for deploying end portions of an insulated signal wire and ground wires juxtaposed therewith, to locate said wire end portions in respective wire receiving channels of electrical contacts on opposite sides of an insulating electrical connector body, comprises means for combing out the wire end portions into parallel relationship, means for pushing back the insulation from the end portion of the signal wire and for splaying the wire end portions in opposite directions to locate them so as to straddle the connector body and means for wiping each wire end portion into a respective one of the wire receiving channels.

20 Claims, 48 Drawing Figures

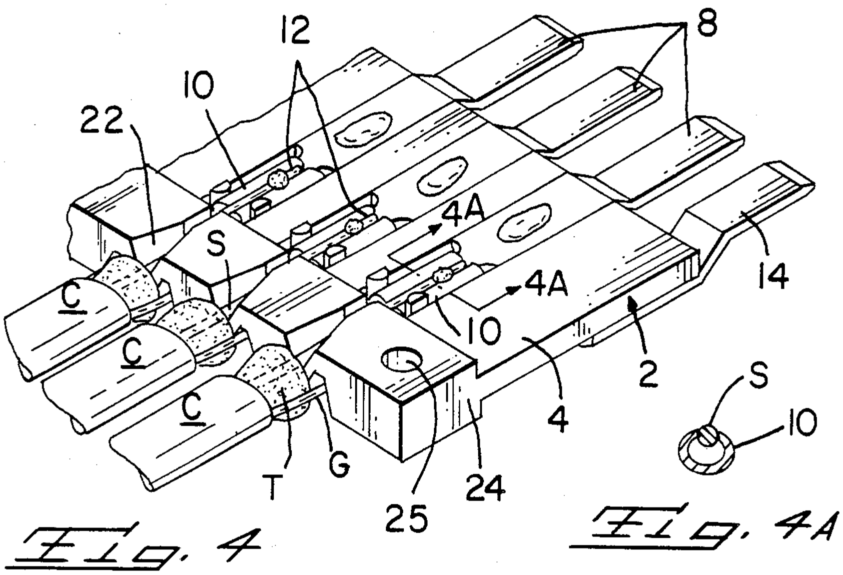
Fig. 4
Fig. 4A
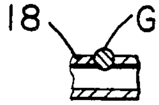
Fig. 5A
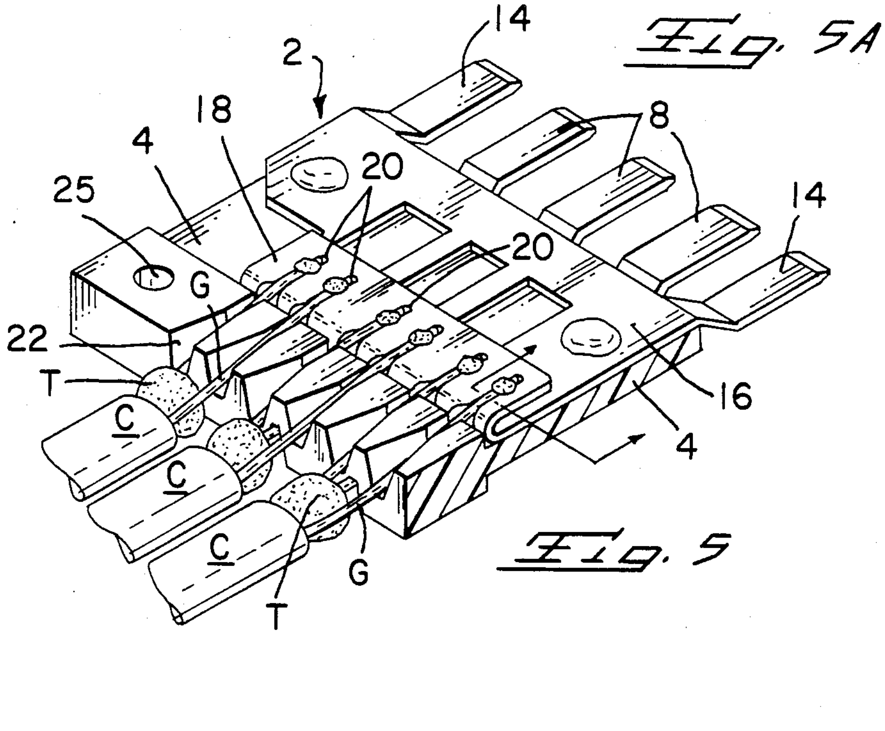
Fig. 5

Fig. 29
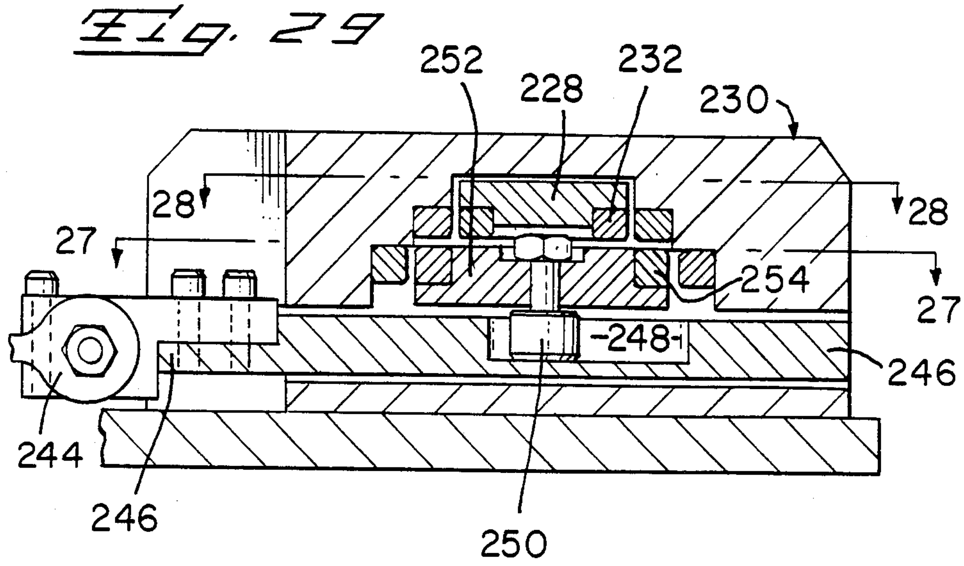
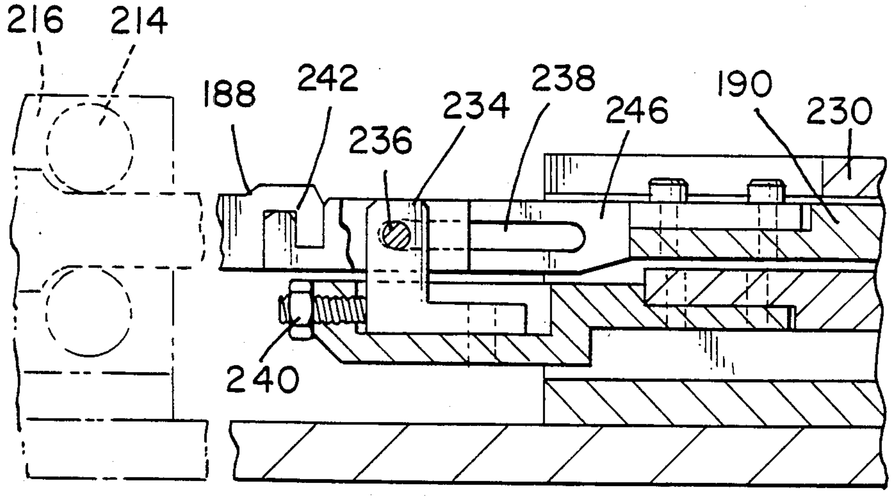
Fig. 30

254
278
270
280
276
268
272
266
274
263
259
263
262
256
252'
258
261
298
306
308
35
35

WIRE DEPLOYING APPARATUS AND METHOD OF USING

This invention relates to an apparatus for deploying juxtaposed wire end portions to locate said wire end portions in respective wire receiving channels of electrical contacts on opposite sides of an insulating electrical connector body.

Such an electrical connector body may have on one side a ground plane in which a plurality of channels are formed each for receiving a ground wire, and on its other side, a plurality of electrical terminals each defining a channel for receiving a signal wire. When the wire end portions have been inserted into the channels, the wires can be permanently secured therein by welding, for example by laser beam welding.

Cables to be terminated to the contacts, will usually each comprise a cable jacket enclosing an insulated signal wire and on each side thereof, an insulated ground wire.

Prior to such termination, the jacket is stripped from an end of the cable to expose end portions of the wires. It is however, impracticable to remove the insulation from the end portion of the signal wire when the jacket is being stripped from the cable end.

Apparatus according to the invention is arranged, first to comb out the wire end portions into parallel relationship, then to deflect or splay the wire end portions in opposite directions and to locate them so as to straddle the connector body, and finally to wipe each wire end portion into the appropriate wire receiving channel. Tooling for carrying out these operations is mounted on a carriage, which is movable towards and away from the wire end portions, which may be retained in position relative to the tooling by means of a cable clamp on a conveyer for conveying the cable end from a stripping station for removing the end portion of the cable jacket. Tooling for carrying out the operations of combing out the wires, pushing back the insulation, where at least one of the wire end portions is insulated, and deflecting the wires, is arranged in a tooling assembly mounted on the leading end of the carriage, means for wiping the wire end portions and means for supporting the connector body being mounted on the carriage, just rearwardly of the said tooling assembly, the wiping means being carried by a slide on the carriage which is movable towards and away from the tooling.

The tooling assembly may comprise a frame in which individual upper and lower tools are slidably mounted for movement towards and away from the wire end portions. These tools may comprise upper and lower wire combing tools, upper and lower composite tools serving the purposes of both pushing back said insulation and deflecting the wires and upper and lower pilot tools for aligning a connector in the connector support both with the other tools of the assembly and with the wiping means. Said composite tools may be provided with means for pushing back the insulation from the ends of all of the wire end portions where all of these are insulated. The wiping means preferably comprises a pair of wipers mounted on the slide for movement towards and away from one another by means of a further slide.

The tools and the wipers may conveniently be operated through linkages which are acted upon by means of respective cams on a common cam shaft on the carriage.

There may be mounted beside the carriage, a magazine containing a stack of connector bodies, ram means being provided for feeding a connector body at a time from the magazine into the connector supporting means. The connector supporting means may have connected thereto a connector body feed channel a first ram being provided for feeding a connector body into said channel in a first position of the carriage and a second ram being provided for feeding said body into the connector support in a second position of the carriage.

FIGS. 2 to 5 are perspective views illustrating consecutive steps in deploying the wires of the cables and terminating them to an electrical connector;

FIGS. 4A and 5A are views taken on the line 4A—4A and 5A—5A of FIGS. 4 and 5, respectively;

FIG. 29 is a view taken on the lines 29—29 of FIG. 20;

FIG. 30 is a view taken on the lines 30—30 of FIG. 27;

Figure 1:
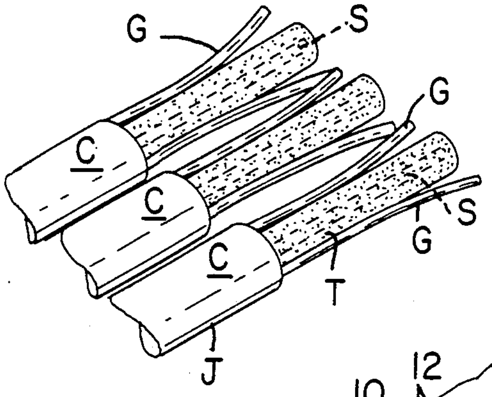
FIG. 1 is a perspective view of the partially stripped end portions of three juxtaposed insulated three-wire electrical cables.

The operations to be performed by the wire deploying apparatus will now be described with reference to FIGS. 1 to 5A. As shown in FIG. 1, cables C each comprise two ground wires G between which is a signal wire S covered by foam insulation, T, which in this example is made of polytetrafluoroethylene, each cable C having an outer cable jacket J. The cables C, which are carried by a clamp (not shown in FIGS. 1 to 5A) of a conveyor of a cable stripping machine (not shown), have been stripped by the machine, so as to remove the jacket J from end portions of the wires. Following the stripping operation, the end portions of the wires do not lie in exact parallelism as will be apparent from FIG. 1.

Figure 2:
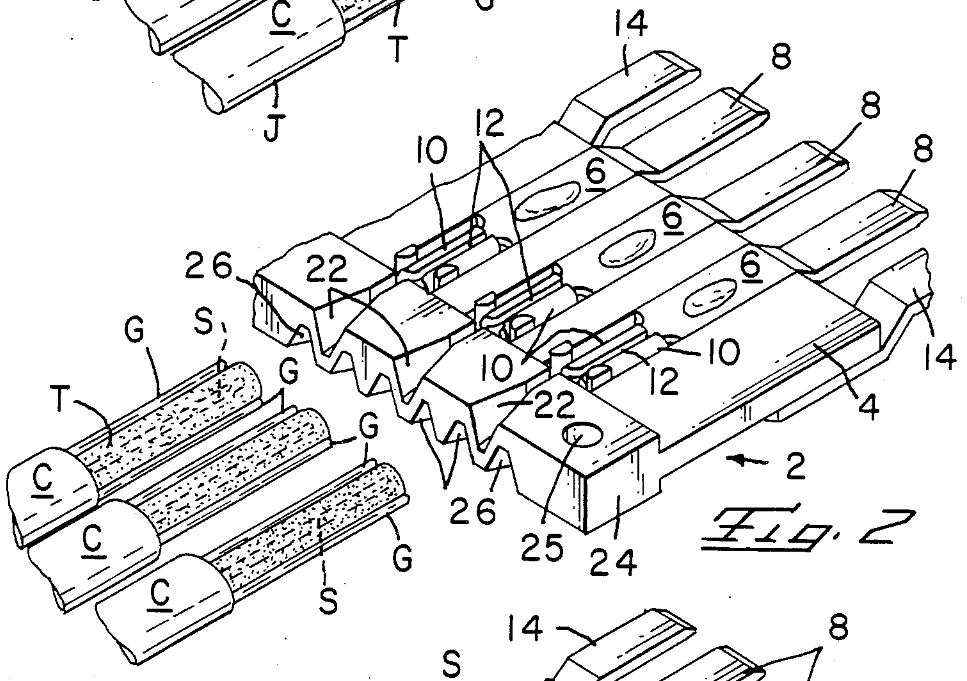
Figure 3:
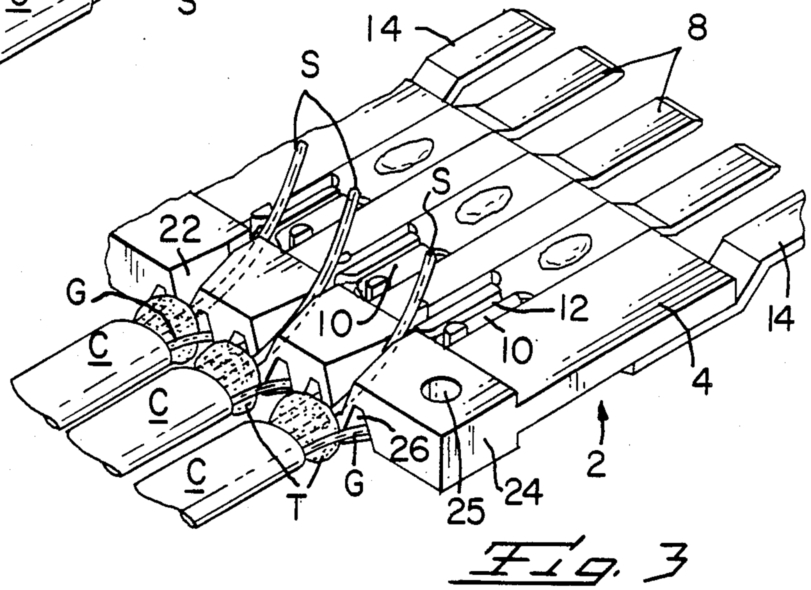

An electrical connector 2, comprises a flat, molded, insulating body 4 having on its upper (as seen in FIGS. 2 to 4) side, flat plug contacts 6 each having at one end, a flat plug 8 projecting from the body 4 and at its other end a wire receiving portion 10 defining a groove 12 extending longitudinally of the contact 6. Plug contacts 14 projecting from the body 4 are formed integrally with a ground plate 16 on the other side of the body 4, as shown in FIG. 5, the plate 16 having a folded back portion 18 remote from the elements 14 and being formed with wire receiving grooves 20 extending longitudinally of the contacts 6. The portions 10 and 18 are shown in cross-section in FIGS. 4A and 5A, respectively. The upper (as seen in FIGS. 2 to 4) side of the body 4, is formed with notches 22 in a thickened edge portion 24 remote from the plugs 8, for guiding wires into the notches 12, the other side of the edge portion 24 being formed with grooves 26 for guiding wires into the grooves 20.

The apparatus to be described hereinafter is arranged first to comb the wires of each cable C into parallel relationship as shown in FIG. 2, to push back the insulation T of each signal wire S so as to bare the end portion of the wire S, to deflect the wires S and G of each cable C vertically away from one another (as showning FIG. 3), to advance the cables C towards the connector 2 to lay the wires S and G in the grooves 22 and 26, respectively, as shown in FIG. 3, and to wipe the wires S into the grooves 12 and the wires G into the grooves 20, as shown in FIGS. 4 to 5A; after which the wires S are welded to the portions 10 and the wires G are welded to the portions 18. Following these welding operations, the insulation T of each cable C is held back by its engagement with the portion 24 of the body 4 as shown in FIGS. 4 and 5. The cables C, thus terminated to the connector 2, are then transported from the apparatus as the conveyor is further advanced.

The apparatus and its operation will now be described in outline with reference to FIGS. 6 to 16. The working tooling of the apparatus comprises a wire comb having an upper tool 28 and a lower tool 30, a mask and deflector having an upper tool 32 and a lower tool 34, a connector aligning pilot having an upper tool 36 and a lower tool 38, upper and lower wipers 40 and 42 (FIGS. 13 to 16), respectively, and a connector guide 44. Said tooling is mounted on a carriage (not shown in FIGS. 6 to 16) which is movable towards and away from a cable clamp 46 of a conveyor (not shown) carrying cables C and which is arranged to dwell in a position opposite to the guide 44. The conveyor moves perpendicularly to the plane of the paper on which FIGS. 6 to 16 are drawn.

Figure 6:
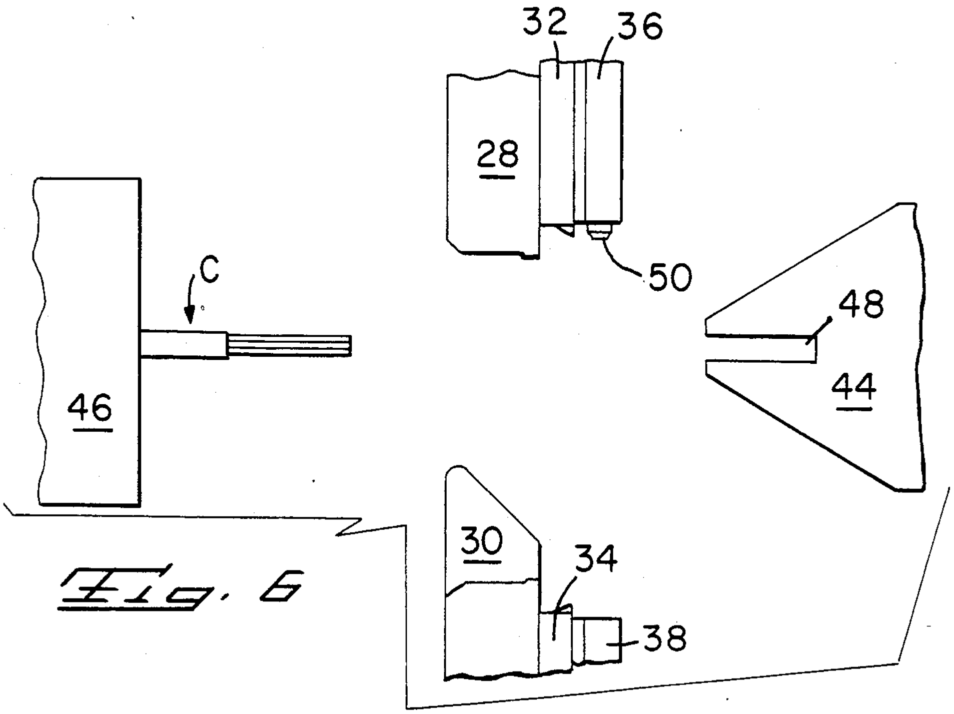
FIGS. 6 to 16 are diagrams illustrating consecutive stages in the cycle of operation of apparatus for deploying the wires and terminating them to the connector.
Figure 7:
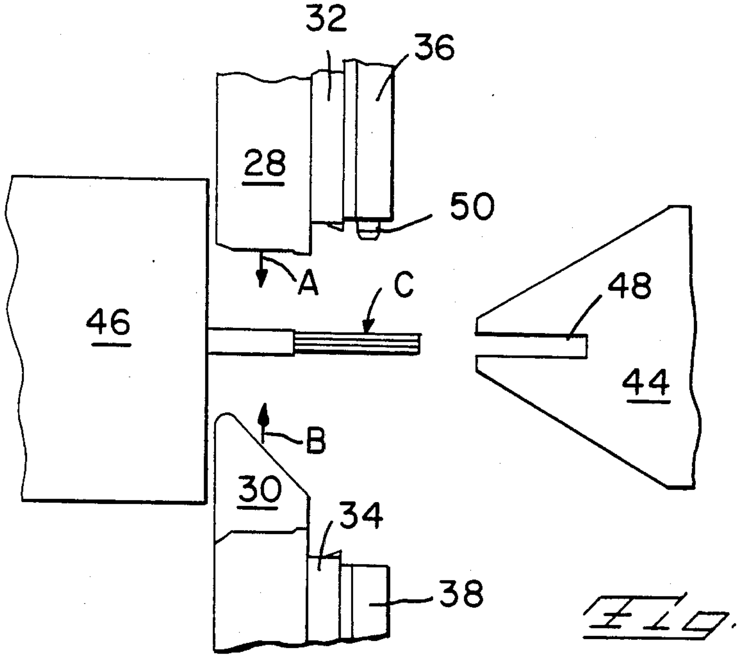
Figure 8:
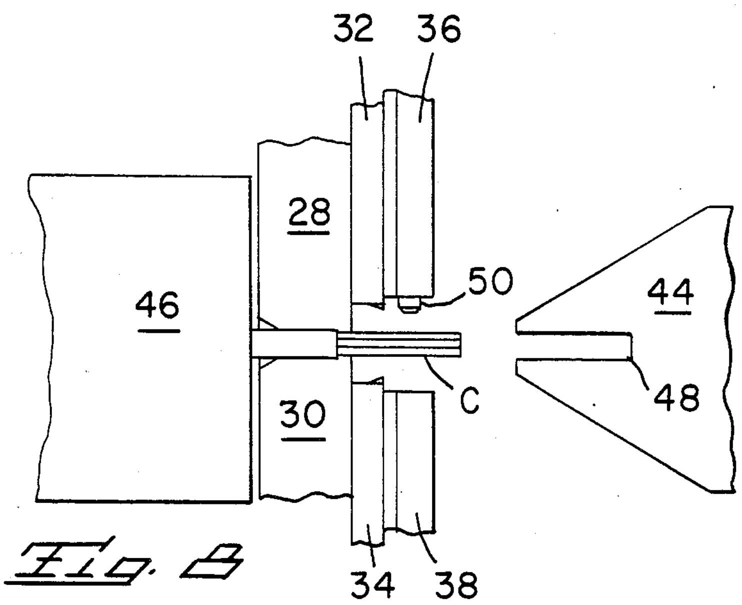
Figure 11:
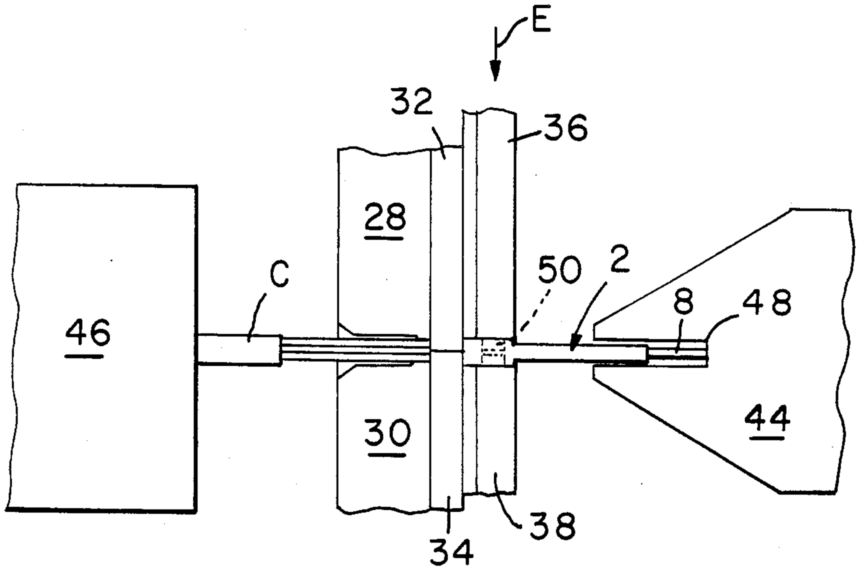
Figure 12:
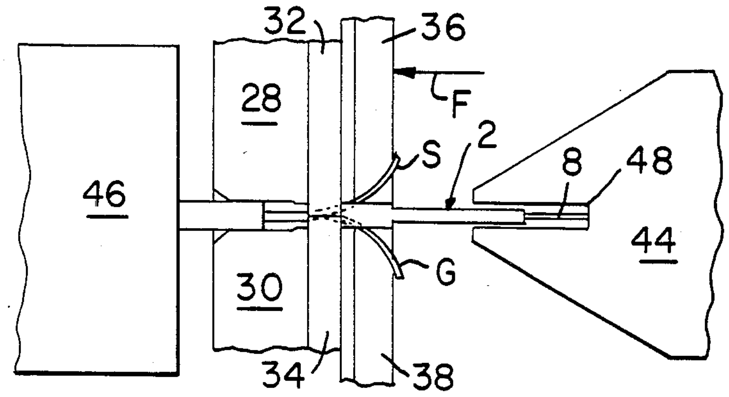
Figure 13:
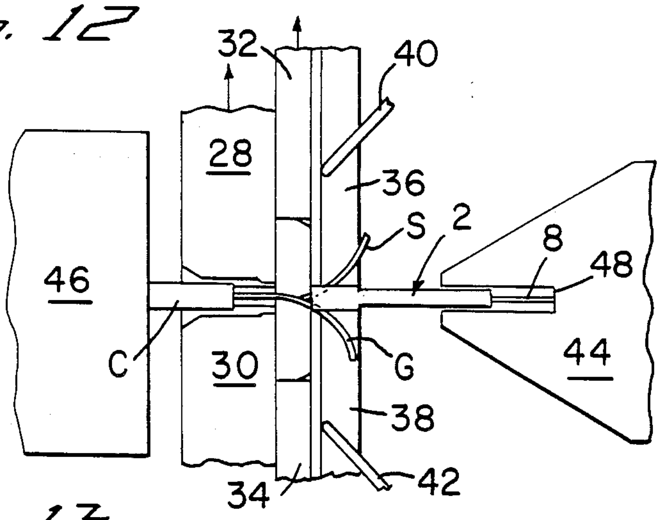
Figure 14:
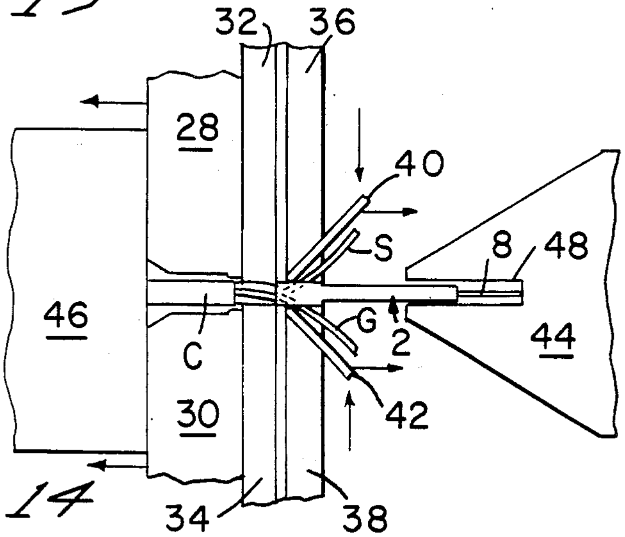

When the clamp 46 comes to rest, the tools 28, 32 and 36 are in a top dead center position, the tools 30, 34 and 38 being in a bottom dead center position (FIG. 6), the carriage being in a fully retracted position remote from the clamp 46 (FIG. 6). The wipers 40 and 42 are also in respective top dead center and bottom dead center positions (FIG. 13). The carriage is now moved to a fully advanced position (FIG. 7) towards the clamp 46 so that the part of the cable C wich projects therefrom lies between the upper tooling 28, 32 and 36, and the lower tool 30, 34, 38 which are simultaneously moved towards the cable C as indicated by the arrows A and B in FIG. 7. As shown in FIG. 8, the comb tools 28 and 30 are then advanced so that their teeth engage between the cables C, and the carriage is retracted from the clamp 46, in the direction of the arrows D in FIG. 9 to a partially advanced position, whereby the wires of the cables C are combed into their parallel relationship (FIG. 2). The carriage now dwells, the mask and deflector tools 32 and 34 are moved relative to the tools 28 and 30 to a closed position, the lower pilot tool 38 is raised, and a connector 2 is fed into a slot 48 in the guide 44 in a direction at right angles to the plane of FIG. 10, the portion 24 of the connector 2 resting on the tool 38 and the other end of the connector 2 being guided by the walls of the slot 48, as shown in FIG. 10. The upper pilot tool 36 is now lowered as shown in FIG. 11 so that spigots 50 of the tool 36 engage in the pilot holes 25 of the connector 2 as shown in FIG. 11, whereby the connector 2 is precisely aligned with the cable C. The carriage is now moved back towards the clamp 46 as indicated by the arrow F in FIG. 12, whereby the insulation T is pushed back along the signal wires S by the mask and deflector tools 36 and 38 and the signal wires S and G of the cables C are deflected away from one another as shown in FIG. 12 and portions of the wires S and G back from their free ends, are inserted into the grooves 22 and 26, respectively, of the portion 24 of the body 4 of the connector 2 in the manner shown in FIG. 3. The wires S and G are progressively deflected by means of appropriately configured teeth and recesses in the tools 32 and 34, as described in detail below with reference to FIGS. 38 to 40. The tools 28, 30, 32 and 34 are now withdrawn from the cable C as shown in FIG. 13 to allow movement of the carriage towards the clamp 46 to allow the wipers 40 and 42 to be engaged with the wires as shown in FIG. 14, the wipers being first moved towards one another to engage the wires S and G and then being moved towards the guide 44 to wipe the wires S and G in their respective slots 12 and 20 as shown in FIGS. 4 to 5A.

As the tools 32 and 34 are withdrawn, the insulation T returns partially to its initial position but is then engaged by the connector 2 and is thereby held back as shown in FIG. 5 as the carriage is moved towards the clamp 46 as described above. The tools 36 and 38 have recesses 39 (FIG. 17A) which allow the wipers 40 and 42 access to the wires.

Figure 15:
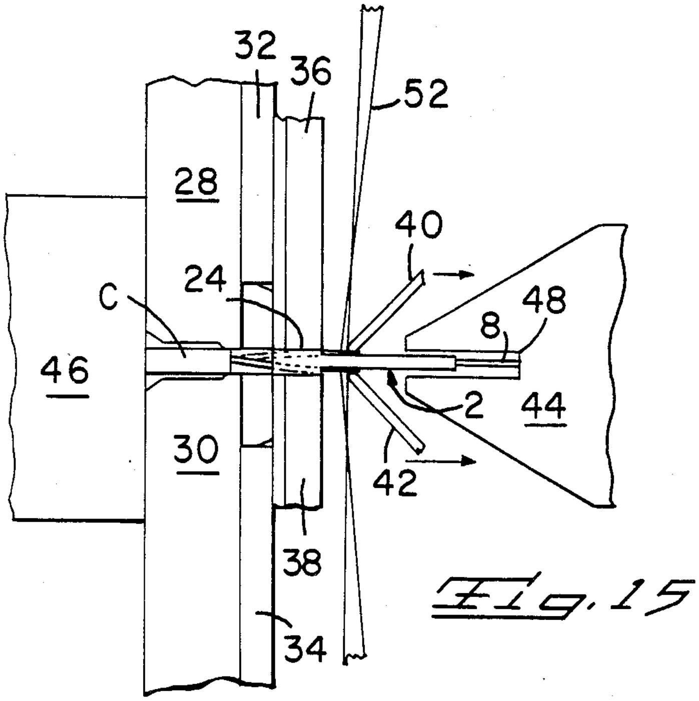
Figure 16:
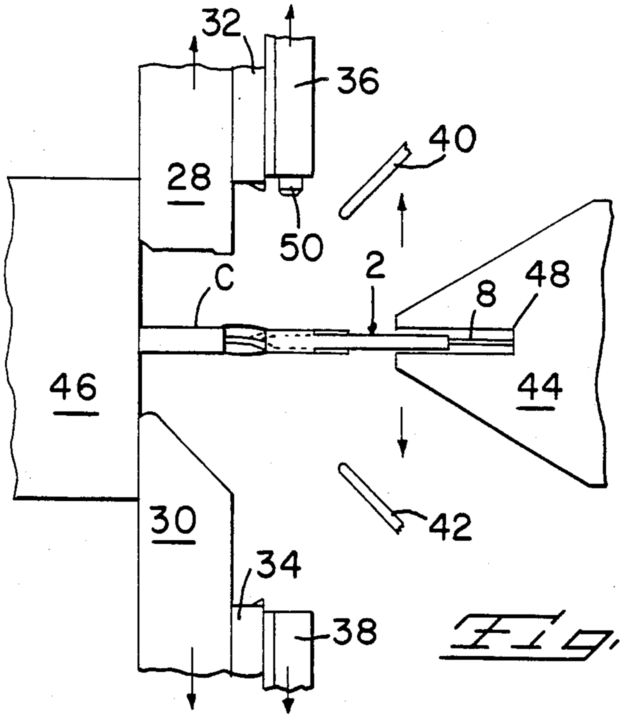

A welding device, in this example, a laser welding device, is then fired to weld the wires S and G into their respective slots. In the present example, a downwardly directed laser beam 52 scans the wires S and welds them into their slots, the beam subsequently being directed upwardly by reflecting means (not shown), to scan the wires G and weld them into the slots 20 (FIG. 15). The tools 28, 30, 32, 34, 36 and 38 and the wipers 40 and 42 are now retracted towards their starting positions as shown in FIG. 16 to release the connector 2 which is now secured to the cables C and the conveyor is stepped forward again so that the connector 2 is removed from the slot 48 of the guide 44 and the apparatus is ready for a further cycle of operation, when the tools and the wipers have been retracted to their starting positions.

Figure 17:
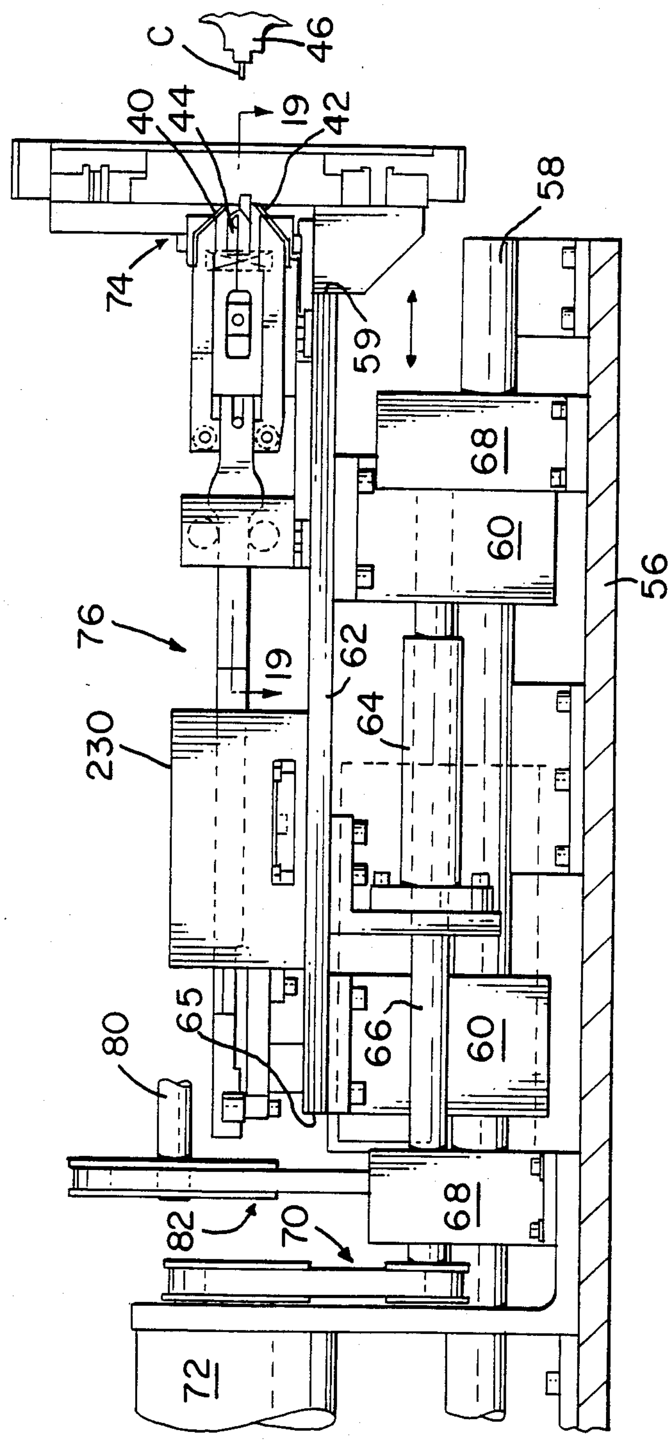
FIG. 17 is a side view of the apparatus with parts omitted.

The apparatus will now be described in detail. As shown in FIG. 17, the apparatus comprises a base plate 56 upon which is mounted a slide plate 58 engagable by slide gibs 60 which are secured to the carriage mentioned above, which is referenced 62 and has a forward end 59 and a rear end 65. Fixed to the bottom of the carriage 62 by means of a bracket 63 is a ball nut 64 through which passes a ball screw 66 mounted in bearings 68. The ball screw 66 is driven through belt drive means 70 by a stepping motor 72, horizontally towards and away from the clamp 46, intermittently, under the control of a microprocessor (not shown), to drive the carriage 62 along a rectilinear path.

Figure 20:
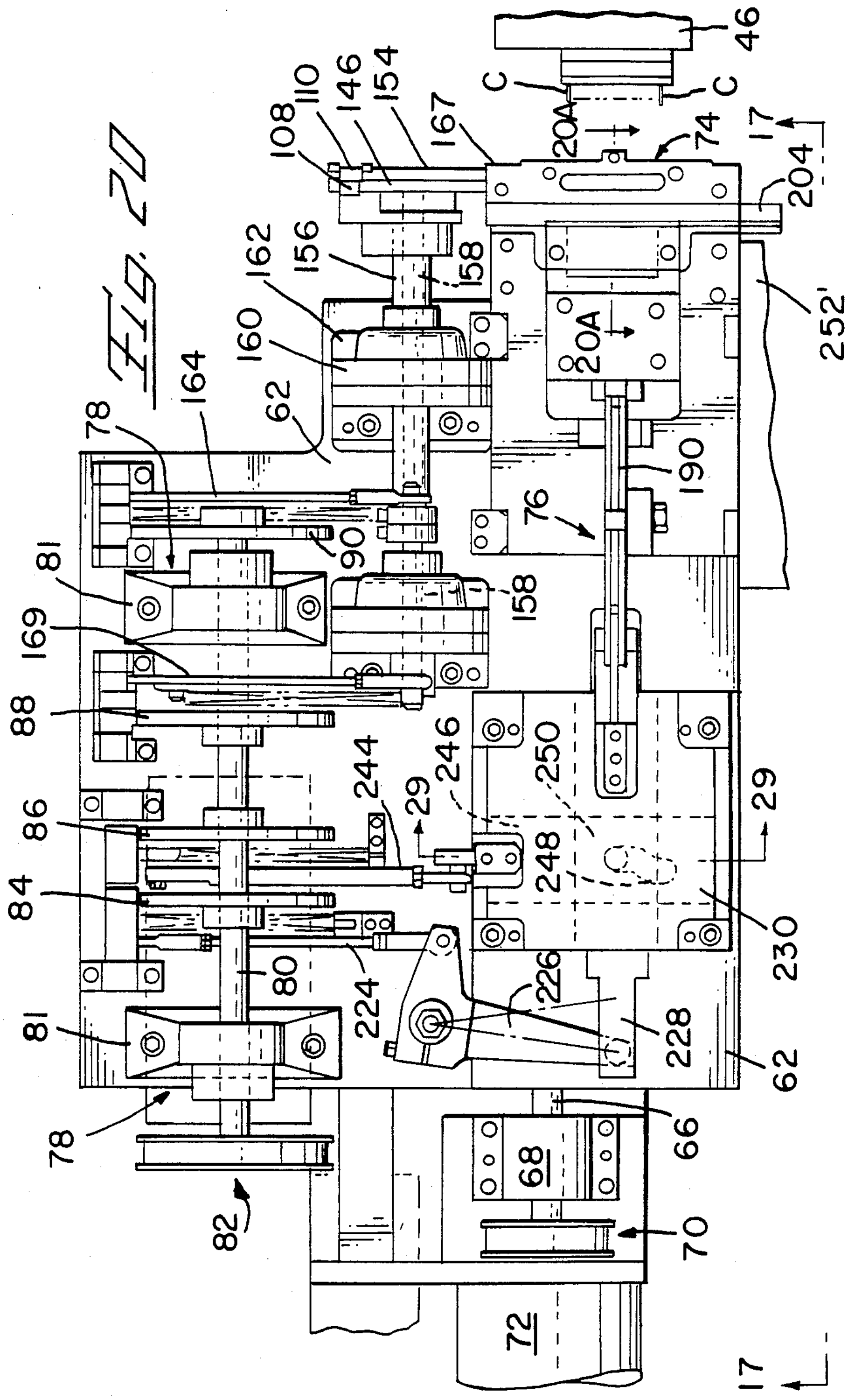
FIG. 20 is partly diagrammatic top plan view of the apparatus; with part omitted.

At the right hand (as seen in FIG. 17) forward end 59 of the carriage 62 is mounted a wire processing assembly 74 comprising the tooling described above with reference to FIGS. 6 to 16. A wiper drive assembly 76 is mounted on the carriage 62 rearwardly, that is to say leftwardly (as seen in FIG. 17) of the assembly 74. A main cam shaft assembly 78 also mounted on the carriage 62, as shown in FIG. 20, has a main cam shaft 80, (only part of which is shown in FIG. 17) driven by a stepping motor (not shown) through a belt drive 82, and running in bearings 81. Upon the shaft 80 are cams 84 and 86 for bringing about the vertical and the wiping movements, respectively, of the wipers 40 and 42, a cam 88 for driving the mask and deflector tools towards and away from the cables C and a cam 90 for driving the pilot tools 36 and 38 towards and away from the connector 2. The manner in which these cams drive their respective tools will be described below.

Figure 17A:
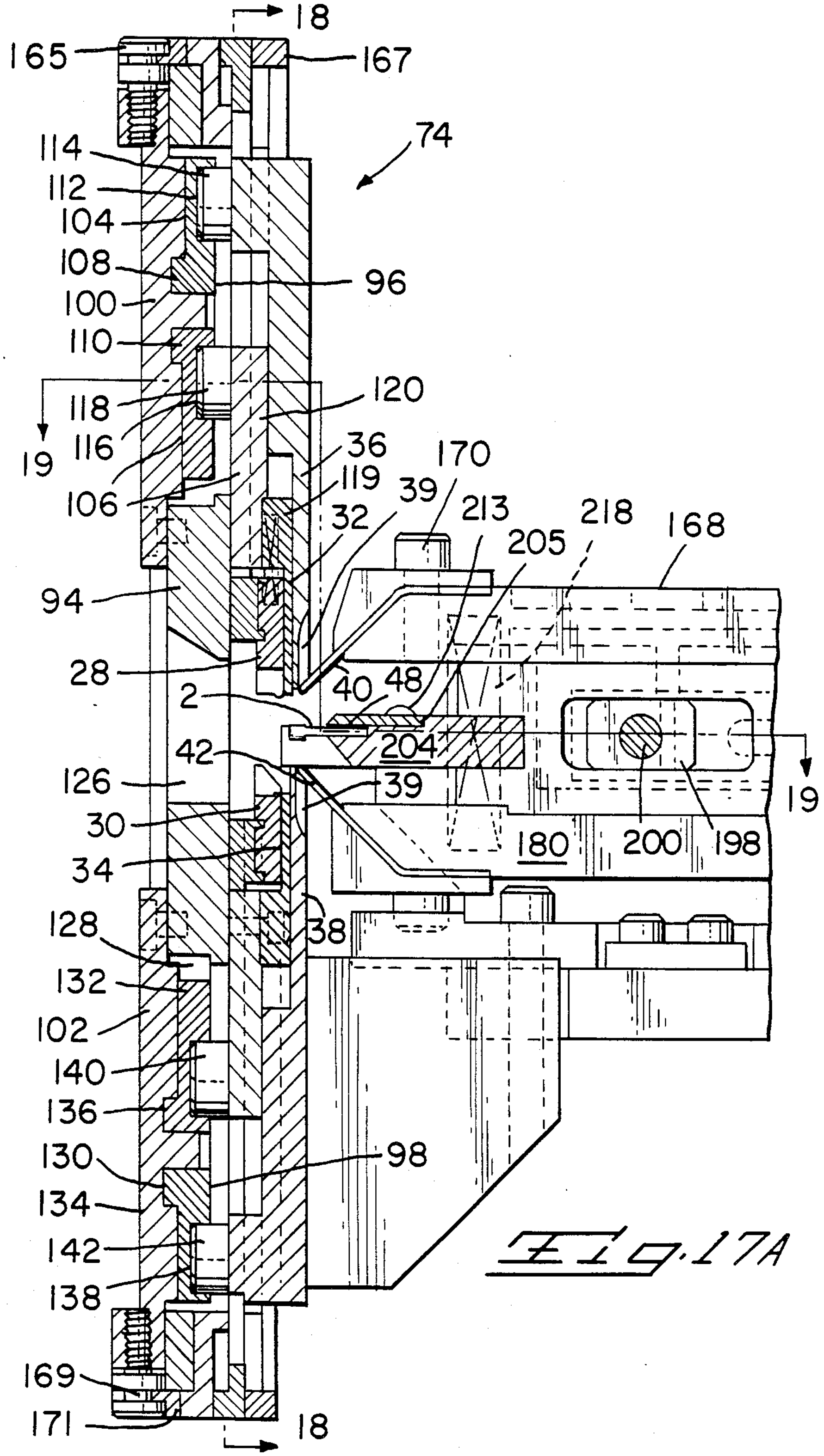
FIG. 17A is a view taken on the lines 17A—17A of FIG. 19.
Figure 18:
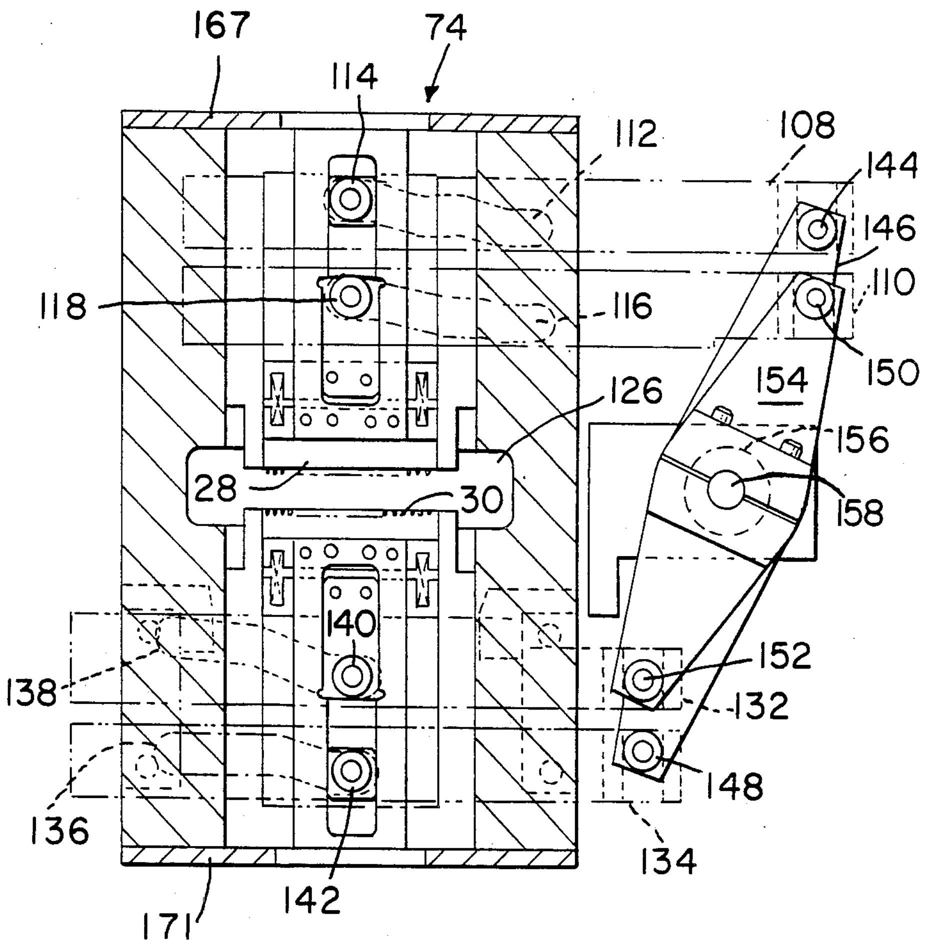
FIG. 18 is a view taken on the lines 18—18 of FIG. 17A.
Figure 19:
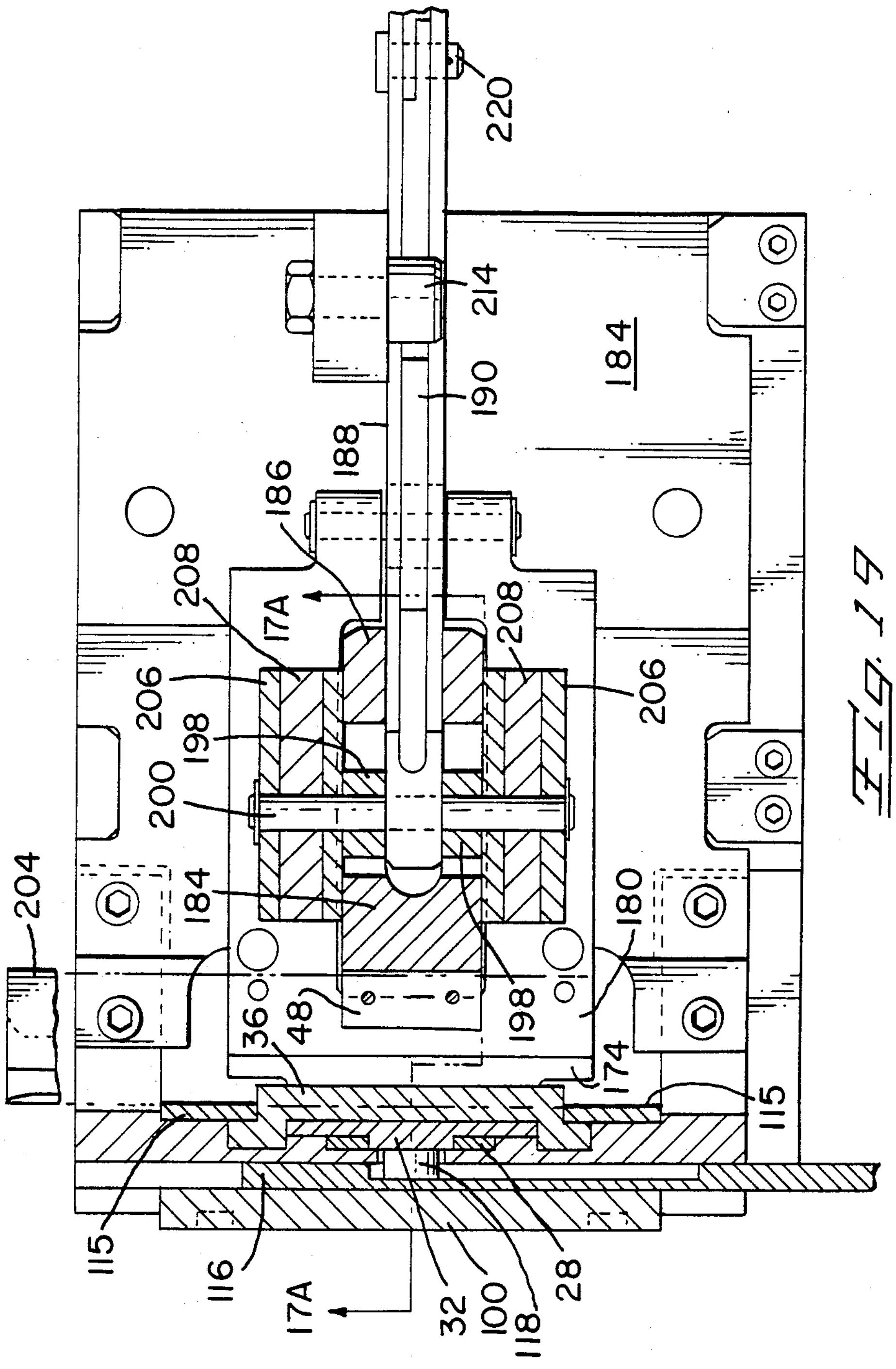
FIG. 19 is a view taken on the lines 19—19 of FIG. 17A.
Figure 21:
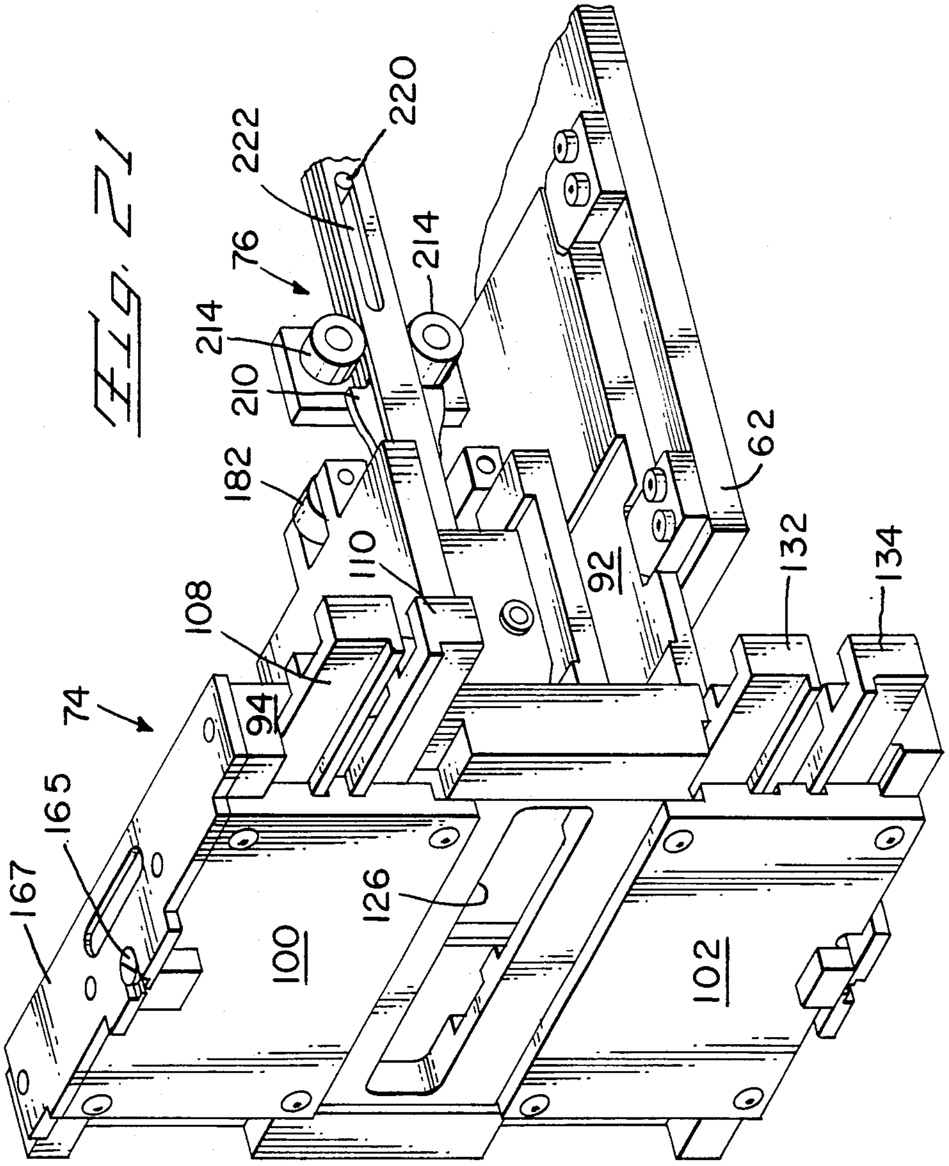
FIG. 21 is a perspective view of a wire processing assembly of the apparatus, with parts omitted, and also shows part of a wiper drive assembly of the apparatus.
Figure 22:
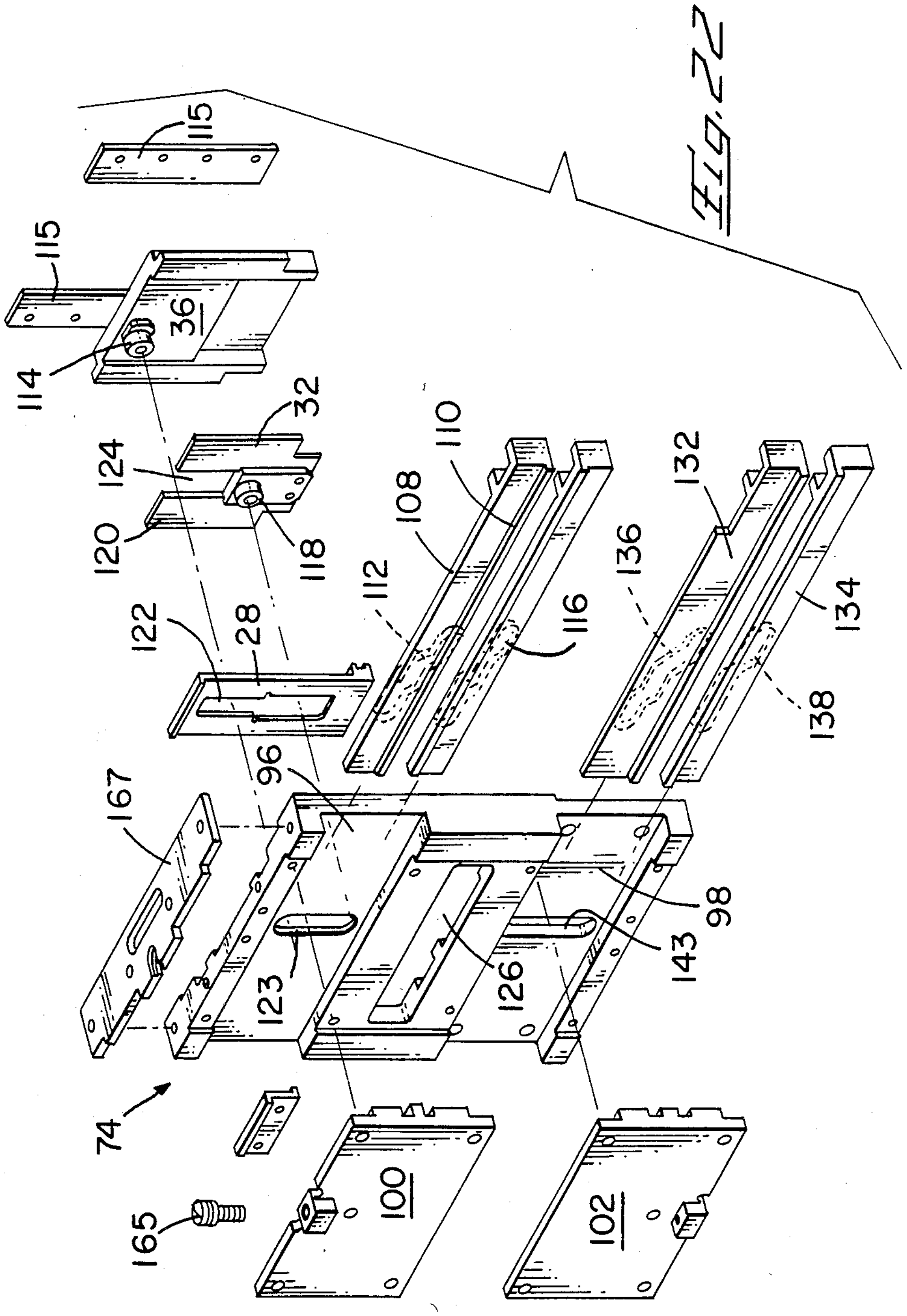
FIG. 22 is a perspective exploded view showing parts of the wire processing assembly.
Figures 23, 24:
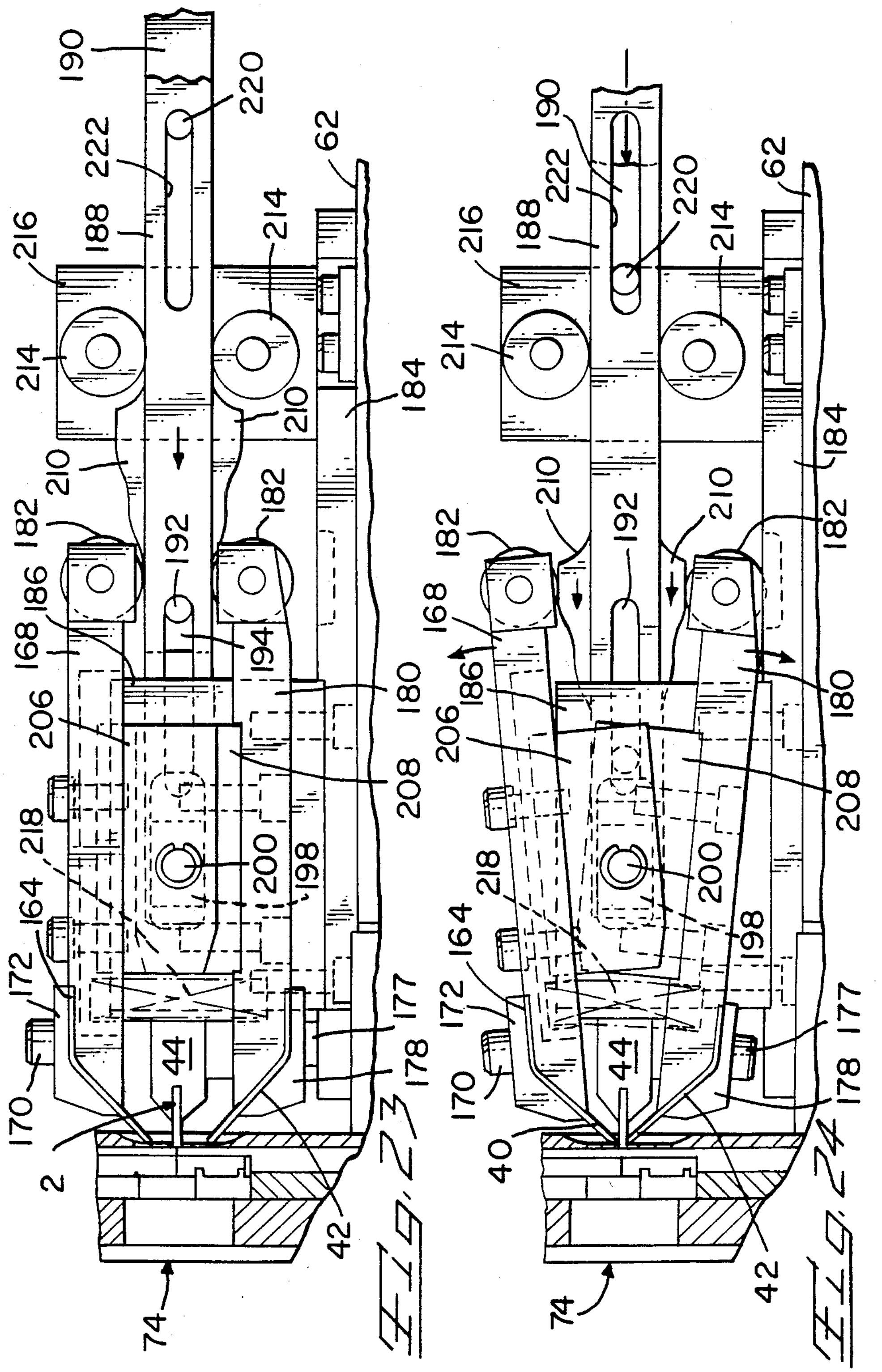
FIGS. 23 to 25 are side views of part of the wiper drive assembly illustrating three respective stages in the operation thereof.

As best seen in FIG. 21, the assembly 74 is secured to the carriage 62 through a base plate 92 upon which a part of the assembly 76 is mounted. The plate 92 projects forwardly of the carriage 62 and is bolted to a face plate 94 of the assembly 74. As best seen in FIGS. 17A and 22, the face plate 94 is provided with upper and lower horizontal cam slide recesses 96 and 98 respectively which are covered by cover plates 100 and 102 respectively. The cover plate 100 cooperates with the floor of the recess 96 to provide tracks 104 and 106 in which linear cams 108 and 110, respectively, are slidable. The cam 108 has a cam track 112 receiving a cam follower 114 on the upper pilot tool 36, the cam 110 having a cam track 116 receiving a cam follower 118 on a plate 120 carrying the upper mask and deflector tool 32 which is loaded by a spring 119. The cam follower 118 passes through a longitudinal opening 122 in the comb 28, the cam follower 114 passing through a longitudinal slot 124 in the plate 120 as well as through the opening 122. The cam followers 114 and 118 project into a slot 123 in the plate 94. The face plate 94 defines an opening 126 for receiving the cables C projecting from the clamp 46. The cover plate 102 cooperates with the base of the recess 98 to define cam tracks 128 and 130 for lower linear cams 132 and 134 respectively having respective cam tracks 136 and 138, receiving respective cam followers 140 and 142. The cam follower 142 projects from the lower pilot tool 38, the cam follower 140 projecting from the lower masking and deflector tool 34 through a slot in the lower combing tool 30. The cam followers 140 and 142 project into a further slot 143 in the plate 94. The linear cams 108, 110, 132 and 134 project laterally from the assembly 74, the projecting portion of the cam 108 being pivoted at 144 to the upper arm of a first rocker 146, as best seen in FIG. 18, the cam 134 being pivoted at 148 to the lower arm of the rocker 146. The projecting portions of the cams 110 and 132 are pivoted at 150 and 152, respectively, to the upper and the lower arms, respectively, of a second rocker 154. The rockers 146 and 154 are pivoted respectively, to concentric shafts 156 and 158 respectively, these shafts being mounted in bearings 160 on a block 162, as best seen in FIG. 20. The cam 90, as it is rotated by the shaft 80, rocks a lever 164 thereby to rock the shaft 156 and thereby also to actuate the rocker 146 so as to bring about a linear movement of the cams 108 and 134 simultaneously. The cam 88 serves to rock a lever 169 which is connected to the shaft 158, during rotation of the shaft 80, so as to actuate the rocker 154 to bring about linear movement of the cams 110 and 132 simultaneously. As best seen in FIG. 18, the cam tracks 112 and 116 are, in the end positions of the linear cams, disposed on opposite sides of their cam followers, with respect to the cam tracks 138 and 136. Thus at each stroke of the rocker 146, the pilot tools 36 and 38 will be moved in opposite directions, that is to say when the rocker 146 is swung in an anticlockwise sense, the tools 36 and 38 will be moved towards one another and when the rocker 146 is swung in an clockwise sense, these tools will be moved away from one anoth3er. Similarly, when the rocker 154 is swung in an anticlockwise sense, the tools 28 and 32 and 30 and 38 will be moved towards one another and when the rocker 154 is swung in a clockwise sense, the tools 28 and 32 will be moved away from the tools 30 and 34. The clockwise and anticlockwise senses just mentioned above are those as seen in FIG. 18. The cams 88 and 90 are so arranged, that in their cooperation with the linear cams 108, 110, 132 and 134, the associated tooling is operated in the manner described above with reference to FIGS. 6 to 16. The plate 100 and thus the upper deflector and pilot tooling can be adjusted for connector height by means of a screw 164 in a top plate 167 of the assembly 74, the lower deflector and pilot tooling being similarly adjustable by means of a screw 169 in a bottom plate 171 of the assembly 74.

Figure 25:
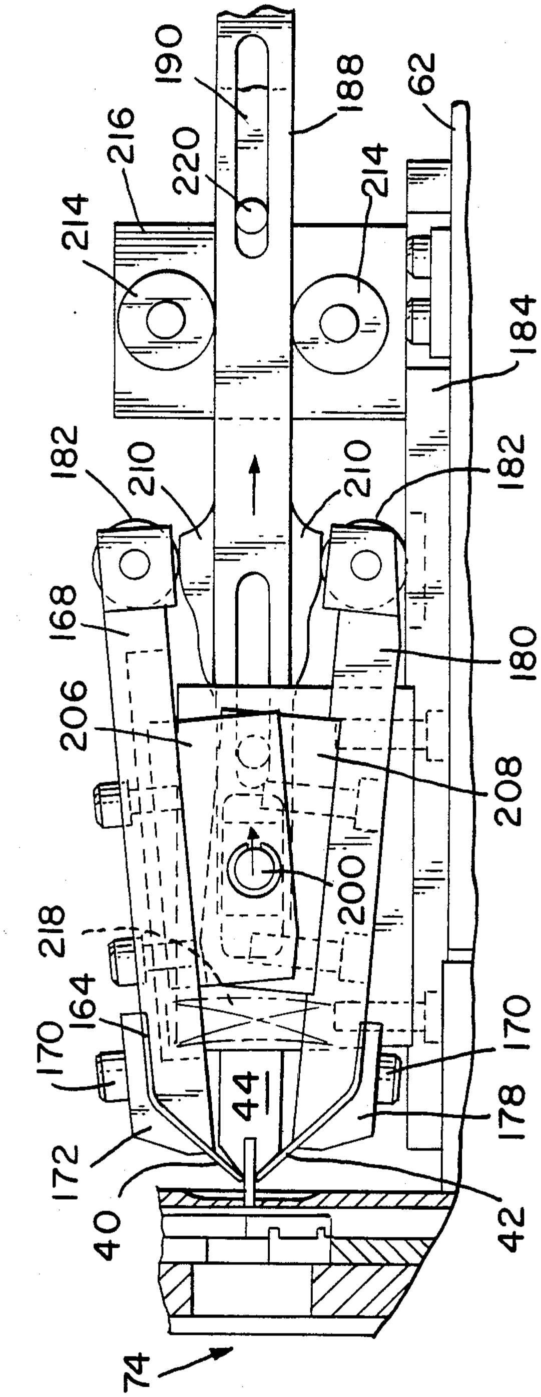
Figure 26:
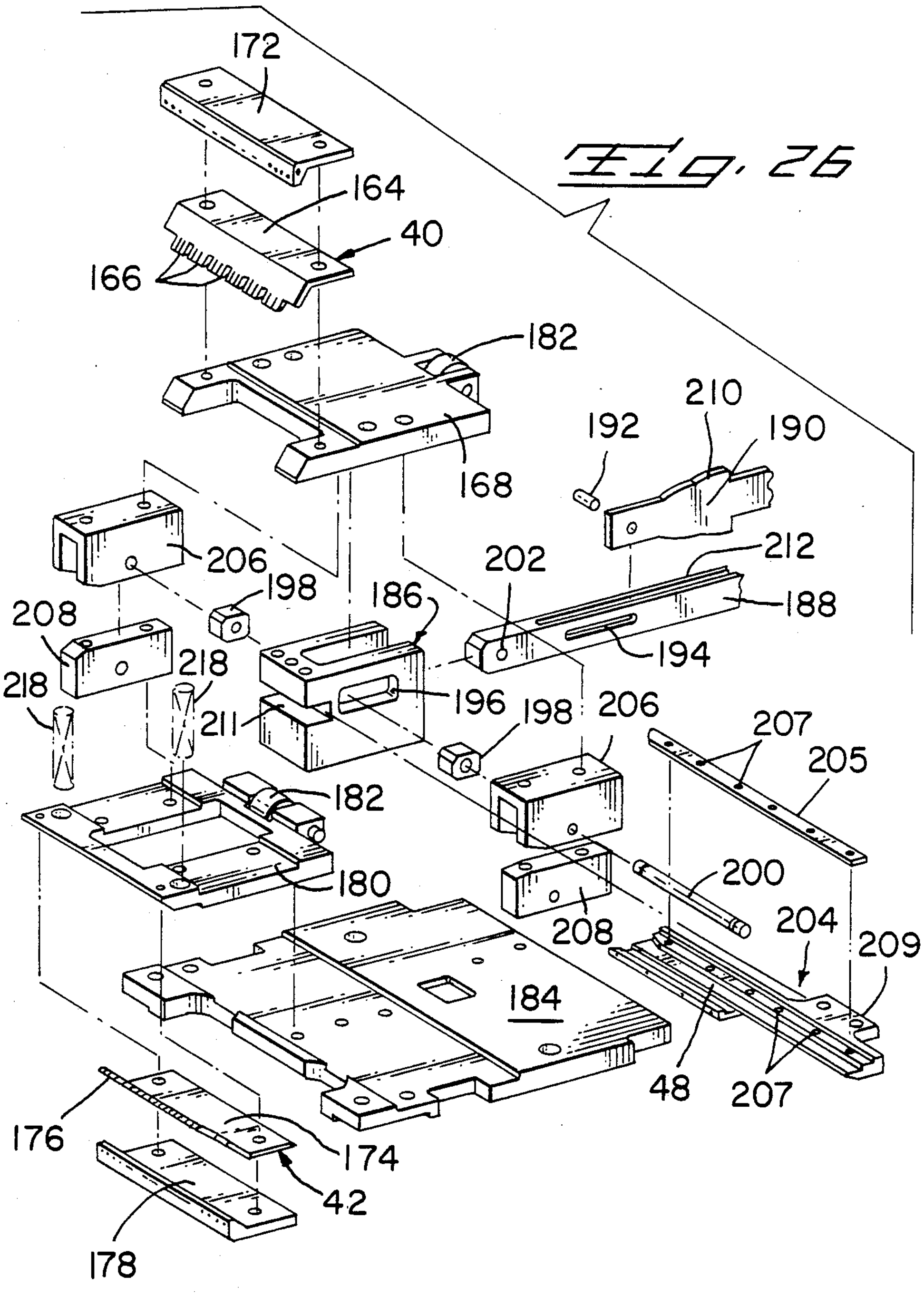
FIG. 26 is an exploded perspective view showing parts of the wiper drive assembly and of a connector guide.
Figure 27:
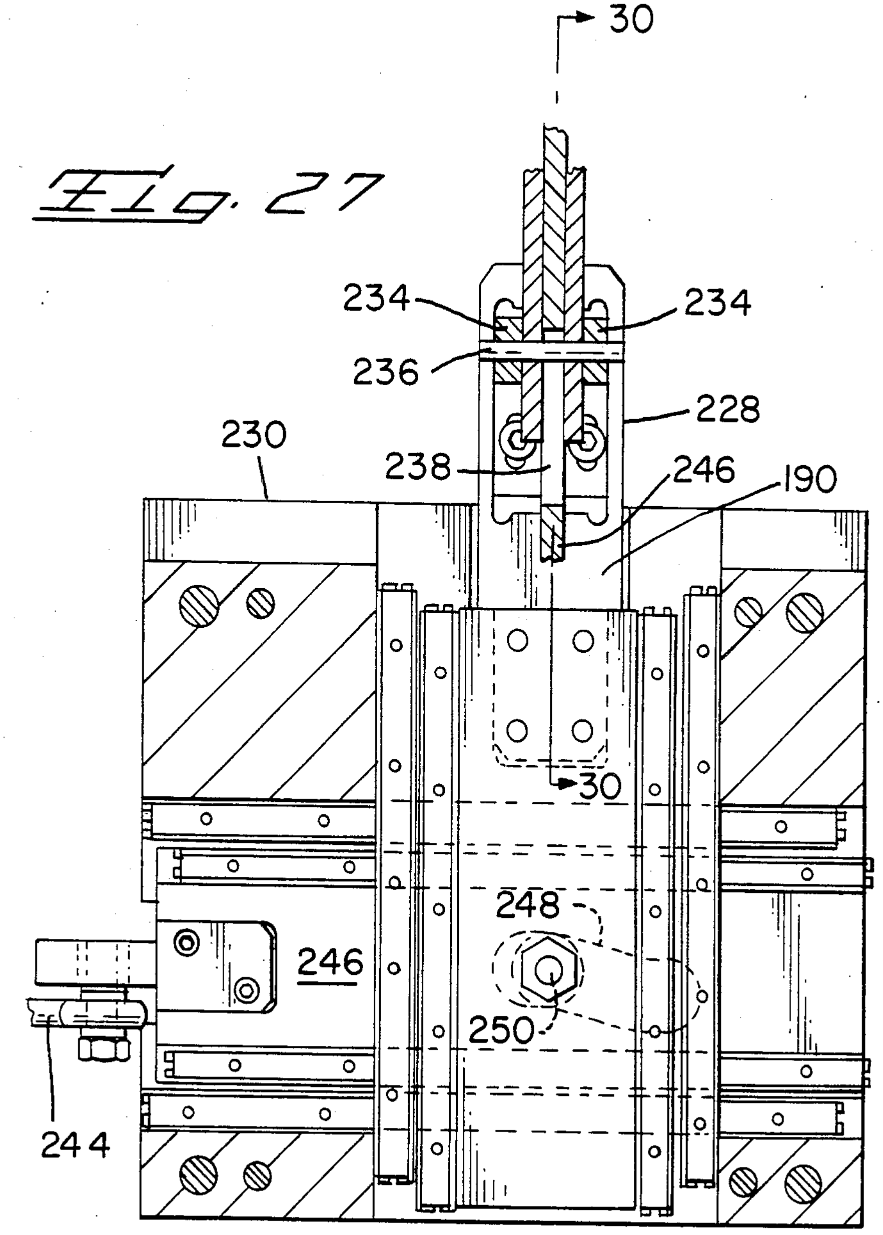
FIG. 27 is a view taken on the lines 27—27 of FIG. 29.
Figure 28:
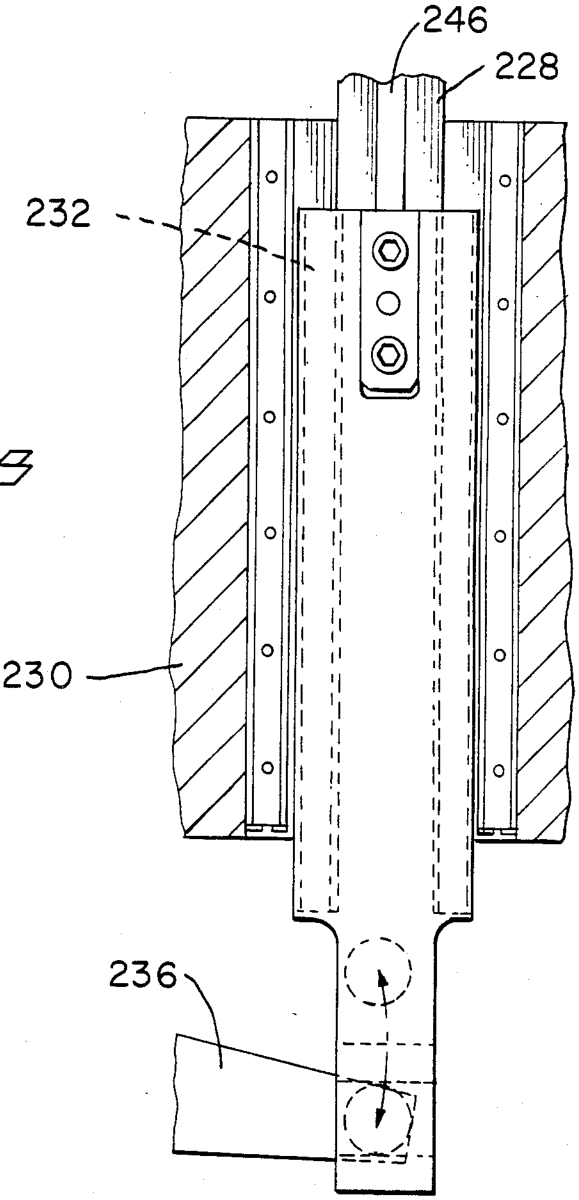
FIG. 28 is a view taken on the lines 28—28 of FIG. 29.
Figure 30A:
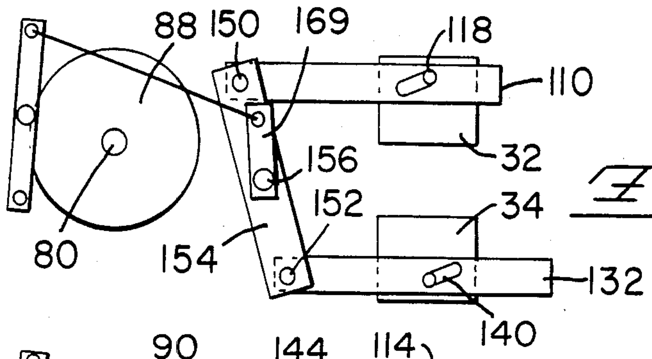
FIGS. 30A to 30D are diagrams of drive systems shown in FIGS. 20 and 31.
Figure 30B:
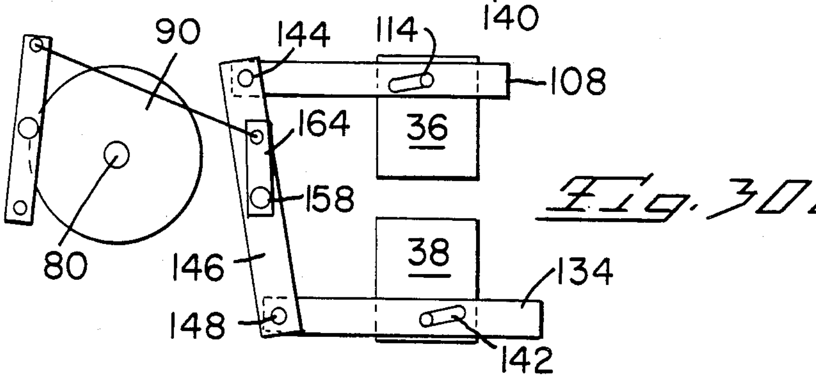
Figure 30C:
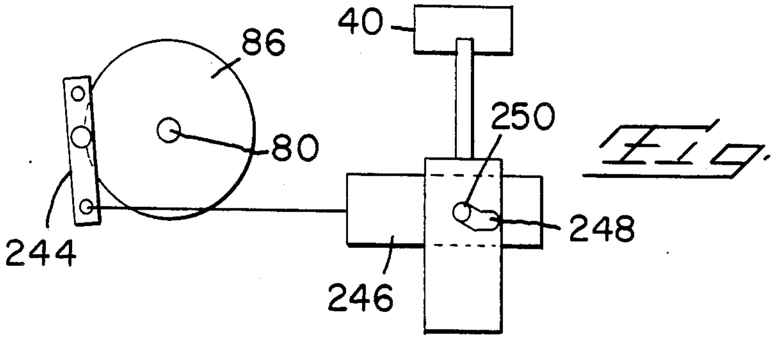
Figure 30D:
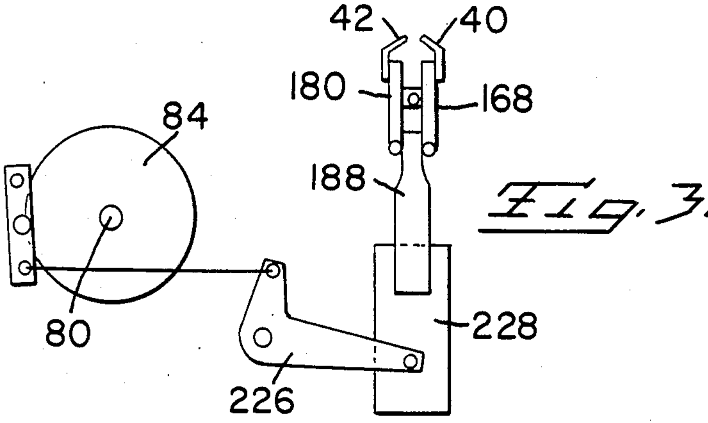
Figure 31:
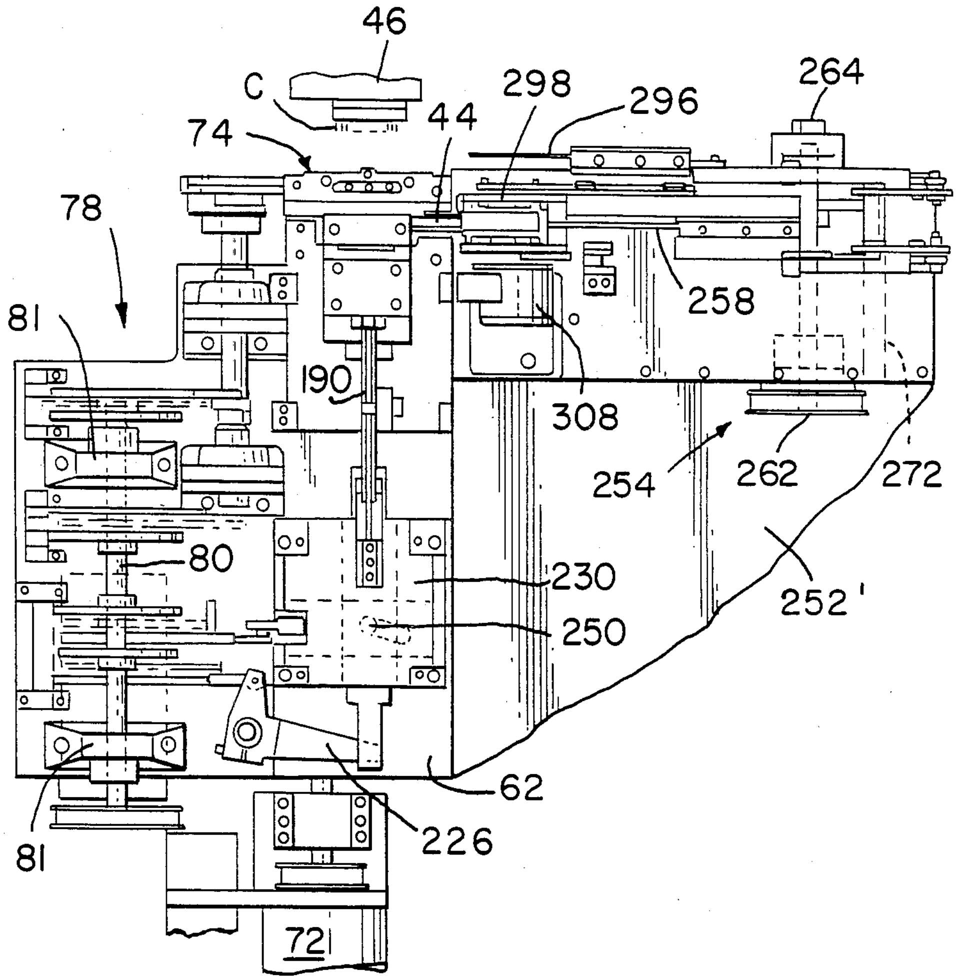
FIG. 31 is a plan view of the apparatus.

The wiper drive assembly 76 will now be described mainly with reference to FIGS. 19 and 23 to 26. As shown in Figure 26, the wiper 40 is in the form of a plate 164 from which project obliquely, individual wiper blades 166 arranged in groups of three, longitudinally of the plate 164. The plate 164 is secured to an upper wiper carrier 168 by means of fasteners 170 (FIGS. 23 to 25) which also serve to secure an upper wiper cover plate 172 to the plate 164. The lower wiper 42, which is also in the form of a plate, 174, from which individual wiper blades 176 project upwardly in groups of three arranged longitudinally of the plate 174, is secured by fasteners 177 (FIGS. 23 to 25) to a lower wiper cover plate 178, the fasteners 177 serving to secure the plate 174 to a lower wiper carrier 180. The carriers 168 and 180 each have at their ends remote from the wiper blades, a clevis in which is mounted a roller 182.

Figure 20A:
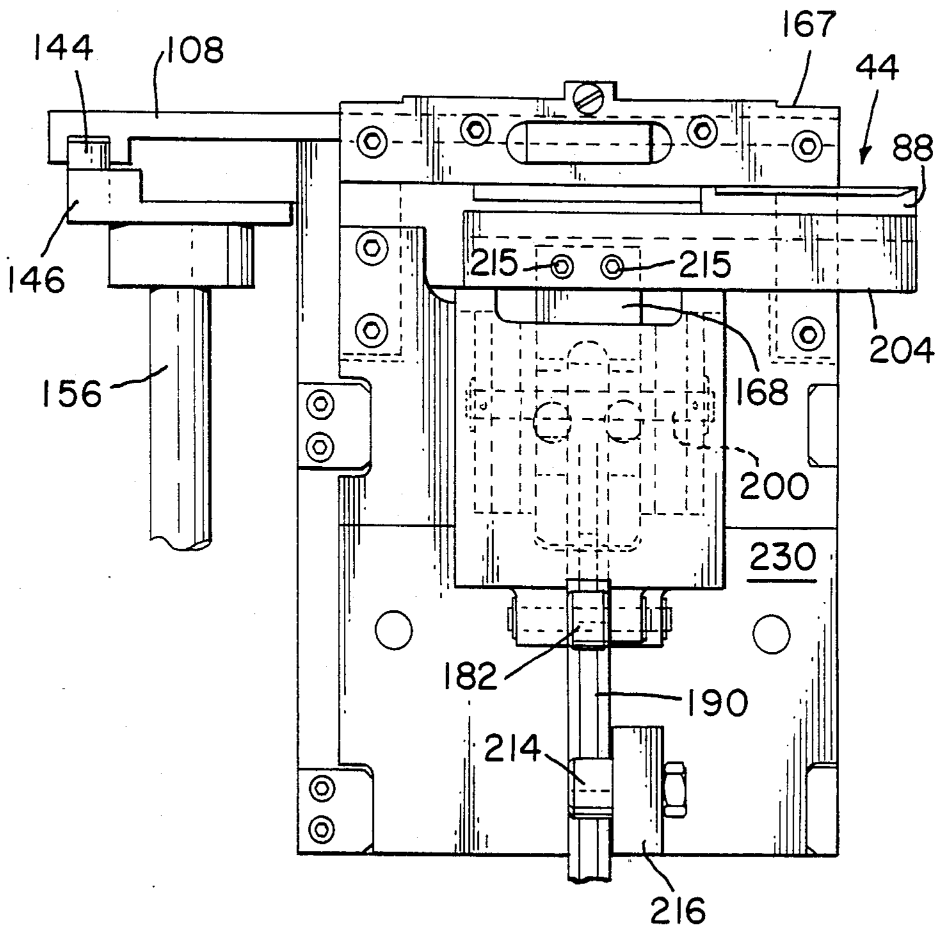
FIG. 20A is an enlarged view of part of FIG. 20.

A base plate 184 bolted to the slide 62 has secured thereto, centrally thereof, a housing 186 receiving a wiper retraction outer slide 188 within which is a wiper opening and closing inner slide 190 through the forward end of which extends a pin 192 which rides in slots 194 formed in the sides of the slide 188. The housing 186 has formed in its side walls, longitudinal slots 196 each receiving a respective slide block 198, a pivot pin 200 extending through the blocks 198 and through a hole 202 in the forward end of the outer slide 188. The left hand (as seen in FIGS. 26) end of the housing 186 receives the connector guide 44 which includes a connector guide plate 205 defining the slot 48, in cooperation with a cap plate 204 screwed thereto by means of screws 213 (FIG. 17A) passed through holes 207 in the plates 204 and 205. The plate 204 has an attachment portion 209 which is received in a channel 211 in the housing 186 and is secured thereto by means of screws 215 (FIG. 20A). Pivotally mounted on each end portion of the pin 200 is a first rocker 206 which receives a second rocker 208 which is also pivotally mounted on the pin 200, the upper wiper carrier 168 being secured to the upper faces of the rockers 206 and the lower wiper carrier 180 being secured to the lower faces of both of the rockers 208. The wiper carriers 168 and 180 are thereby rockable between the positions of FIGS. 23 and 24 about the axis of the pin 200. The inner slide 190 has cam surfaces 210 which project through upper and lower slots 212 in the slide 188. The slide 188 is guided for axial sliding movement, by rollers 214 mounted in a roller housing 216 on the plate 184. Springs 218 engaging between the carriers 168 and 180, forwardly of the pivot pin 200, urge the wipers 40 and 42 towards their fully retracted positions. The inner and outer slides are also relatively guided, by means of a pin 220 on the inner slide 190 which engages in slots 222 in the outer slide 188, back from the rollers 214.

The slide 190 is driven by the cam 84 through a lever 224, which as seen in FIG. 20 is pivoted to a bell crank 226 which is in turn pivoted to an inner slide drive slide 228 which extends into a cam housing 230 on the slide 62, being slidable in bearings 232 therein as shown in FIG. 29. The slide 228 is connected to the slide 190 by means of a straddle block 234 on the slide 228 as best seen in FIG. 30, a pin 236 on the inner slide 190 extending through the straddle block 234 and through slots 238 in the outer slide 188, the forward end position of the slide 228 being adjustable by means of a bolt 240. As the cam shaft 80 rotates, the slide 190 is driven so as to open and close the wipers 40 and 42 as described above with reference to FIGS. 23 and 24.

The outer slide 188 is driven by the cam 86 through a rod 244 (FIG. 20) which is connected to an inner slide cam slide 246 extending transversely of the slide 228 and having a cam slot 248 receiving a cam follower 250 on an outer slide drive slide 252 which is slidable in bearings 254 as shown in Figure 29. The outer slide 188 is connected to the outer slide drive slide 252 by means of a hook coupling 242 (FIG. 30). As the shaft 80 rotates, the slide 188 is driven, through the cam track 248 and cam follower 250, when the cam slide 190 has been fully advanced by the cam 84, so as to retract the wipers 40 and 42 as shown in FIG. 25 so that the wires S and G are wiped into the slots 12 and 20 respectively, after which the wipers 40 and 42 are opened by the cam 84 driving the bell crank 226 in a clockwise (as seen in FIG. 20) sense and the cam 86 retracts the rod 224 so as to retract the slide 246 to return the wipers 40 and 42 to their advanced position.

The drive mechanisms for the mask and deflector tools 32 and 34, for the pilot tools 36 and 38, for the forward and rearward movement of the wipers 40 and 42 and for the opening and closing movement thereof are shown diagrammatically in FIGS. 30A to 30D, respectively.

Mounted on a support plate 251 on the frame 276 of the apparatus, beside the carriage 62, (FIGS. 20 and 31) is a connector feed assembly 254. As shown in FIGS. 31 to 35, the assembly 254 which is mounted beside the assembly 74, comprises a connector initial feed ram 258 fixed to a carriage 259 slidable along a guide structure 261 on rollers 263, and driven by a rotary cam 256 which is in turn driven by a motor 260 through a pulley arrangement 262. The cam 256 which is mounted on a cam shaft 264 has a cam track in which engages a cam follower 266 pivotally connected by a plate 268 to a lever 270, pivotally attached at one end to rod 272 mounted in a bearing 274 fixed to the frame 276 of the apparatus. At its other end, the lever 270 is pivotally attached, at 278, to the carriage 259. The lever 270 is drivable by the cam 256 and by a return spring 280, between the full, and the broken, line positions in which the lever 270 is shown in FIG. 33. Also mounted on the shaft 264 is a further rotary cam 282 having a cam track in which engages a cam follower 284 connected to a lever 286 pivotally attached at one end to the rod 272 and the other end of which is pivotally connected at 288 to a carriage 290 slidable along a guide structure 292 on rollers 294. A connector final feed ram 296 is secured to the carriage 290.

Figure 32:
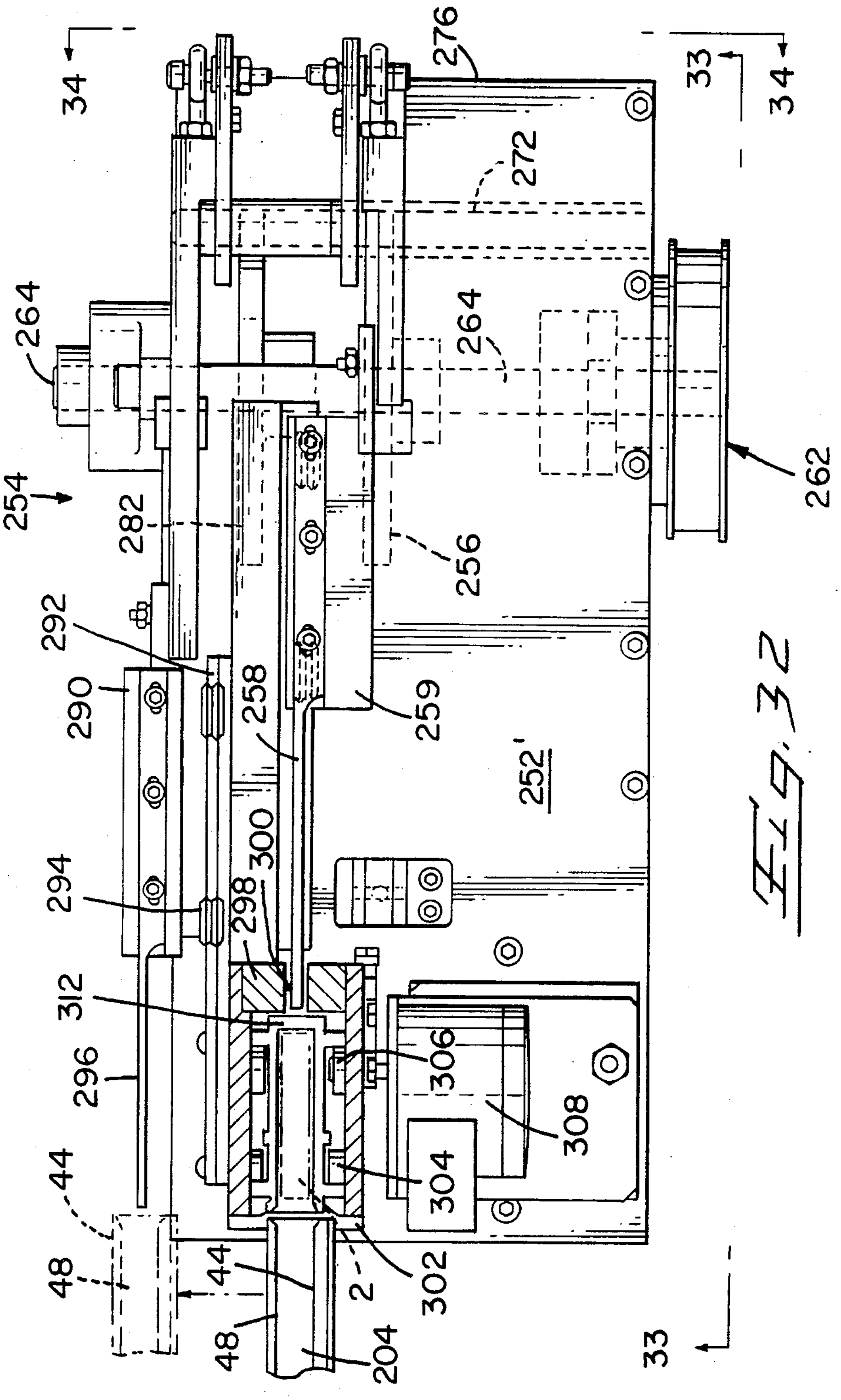
FIG. 32 is an enlarged view of a connector feed assembly of the apparatus.
Figure 33:
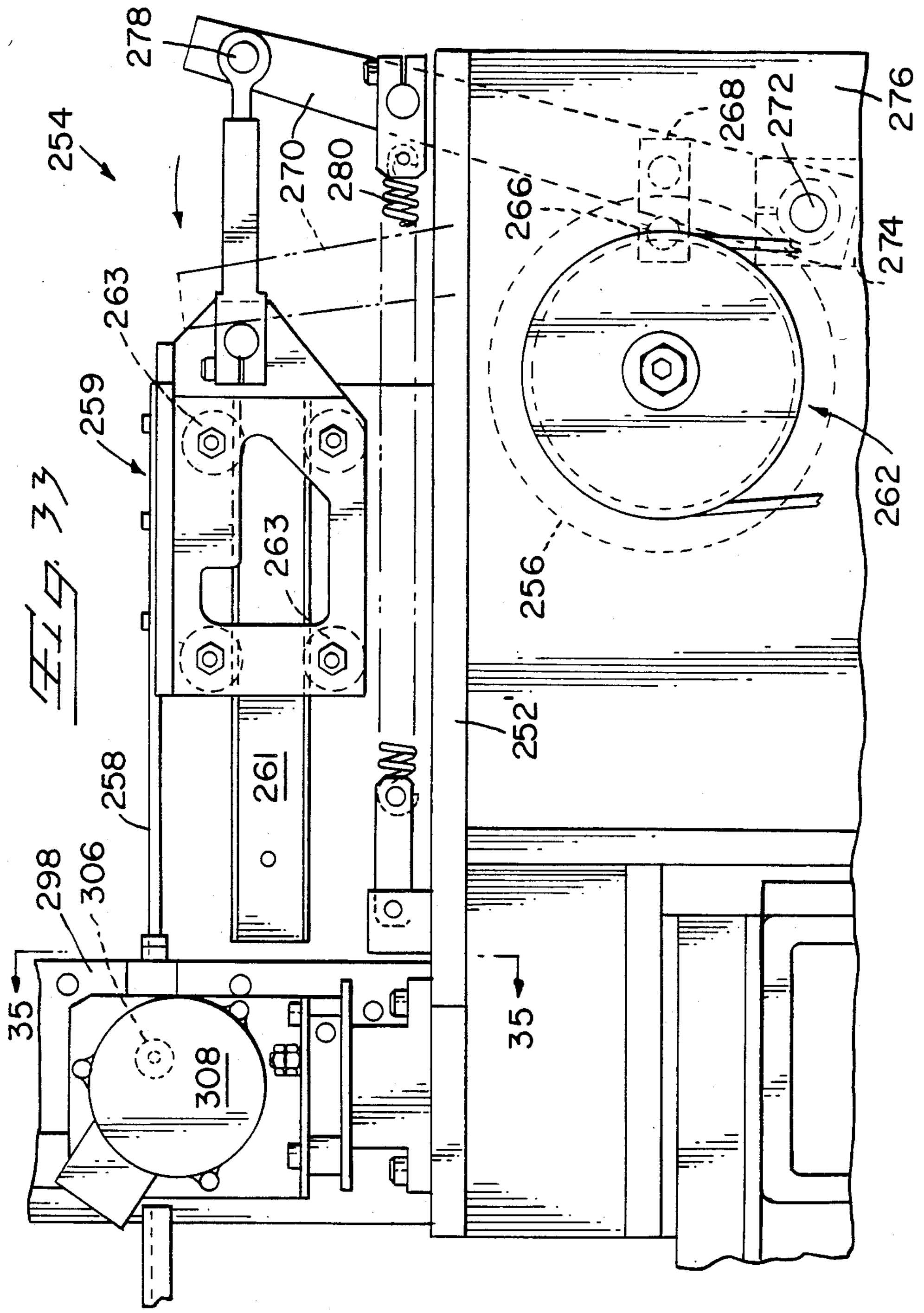
FIG. 33 is a view taken on the lines 33—33 of FIG. 32.
Figure 34:
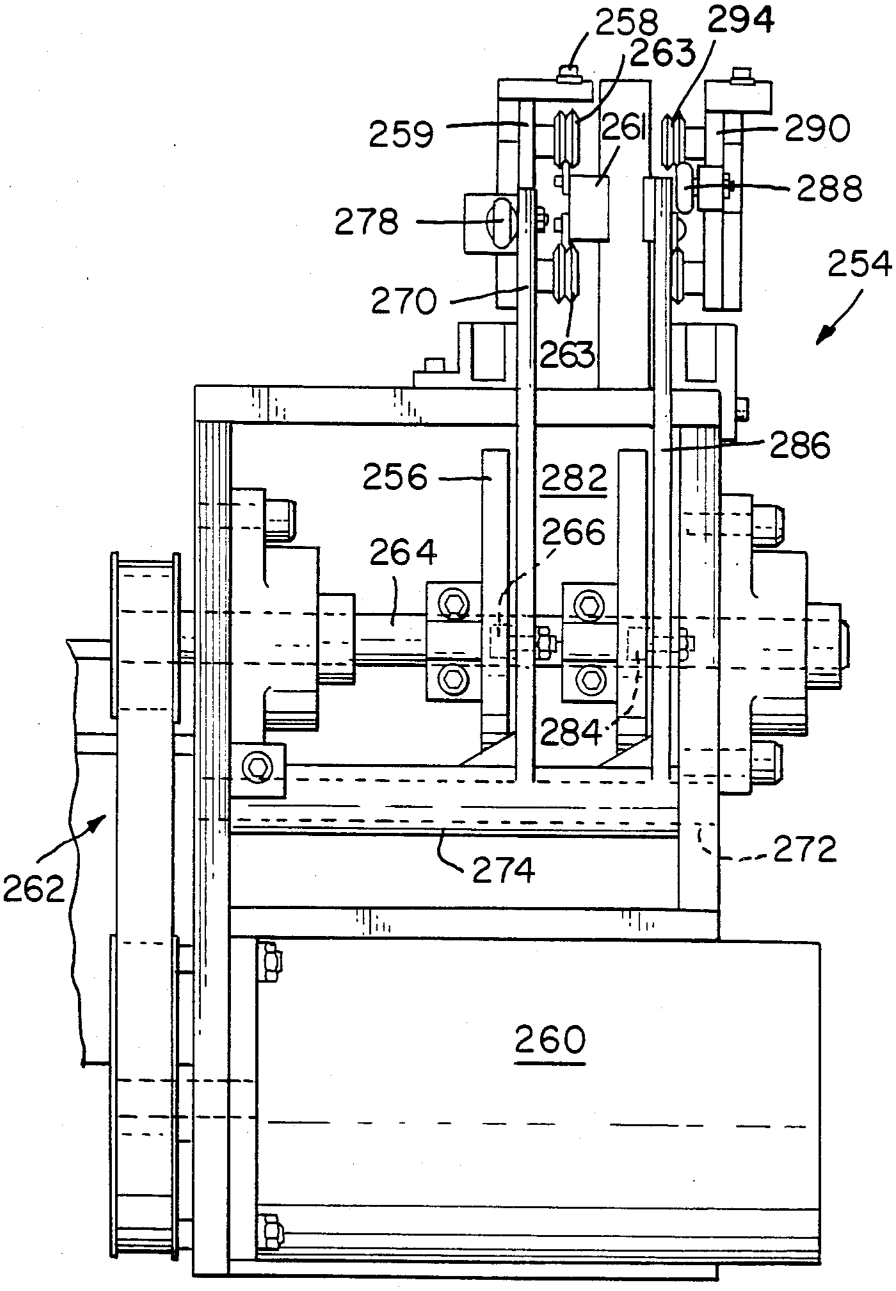
FIG. 34 is a view taken on the lines 34—34 of FIG. 32.
Figure 35:
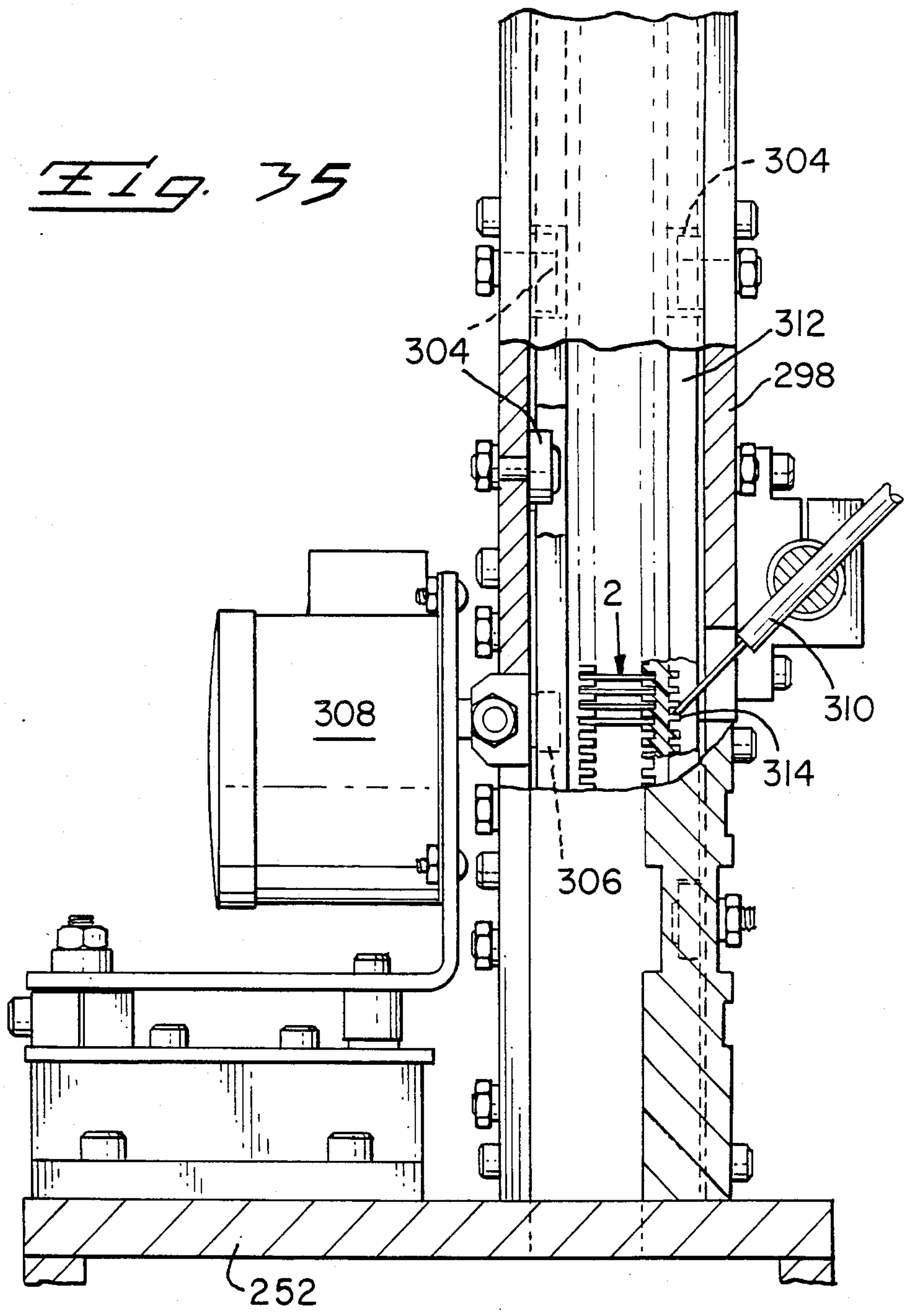
FIG. 35 is a view taken on the lines 35—35 of FIG. 33.

A vertical magazine holder 298 mounted on the plate 252' between the carriage 259 and the carriage 62 has an opening 300 receiving the ram 258 and an opening 302 opposite to the opening 300, which is aligned with the slot 48 in the guide 44 when the carriage 22 and the guide 44 are in their fully retracted position, as shown in FIGS. 6 and 32. The holder 298 has internal guide rollers 304 and internal driven roller 306 coupled to the spindle of a clutch-brake motor 308 fixed to the plate 252. A fiber optic sensor 310 secured to the holder 298 projects thereinto, as shown in FIG. 35. The holder 298 receives an elongate plastics magazine 312 containing a stack of connectors 2 and being slidable on the rollers 302 axially of the holder 298 and being drivable downwardly by the roller 306, towards the plate 525' and past the guide 44 when it is in said retracted, FIG. 6, position. As the magazine 312 is being so driven, the sensor 310 cooperates with sensor projections 314 on the magazine 312 to stop the motor 308 when the connector 2 of the stack is aligned with the slot 48 of the guide 44.

Figure 9:
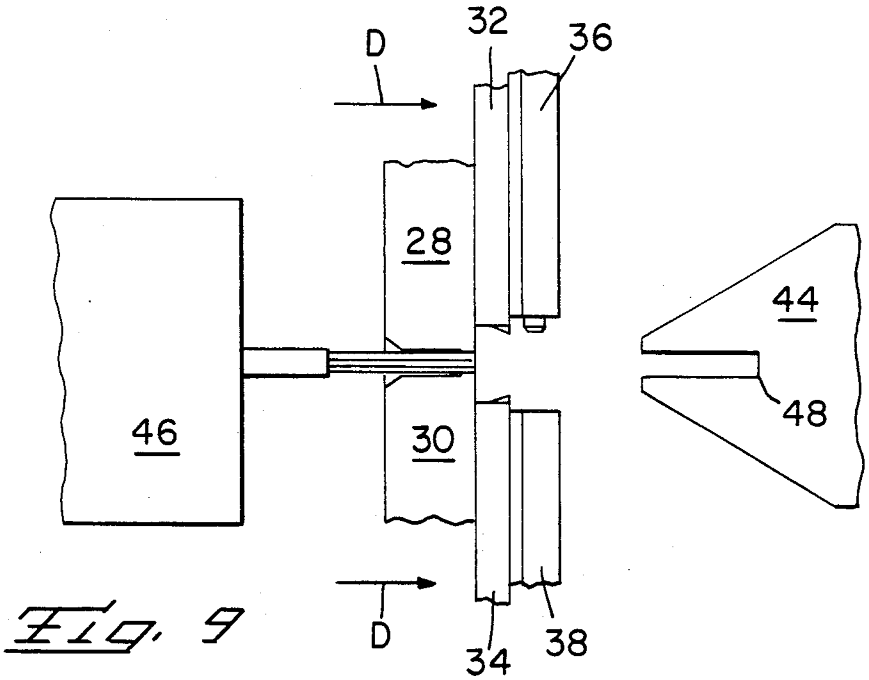
Figure 10:
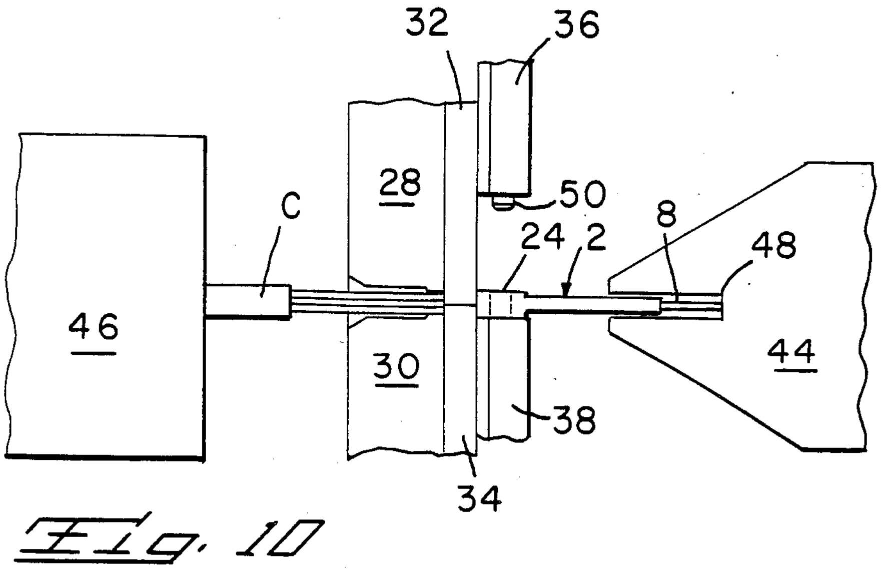

The cam tracks of the cams 256 and 282 are so arranged that when the guide 44 dwells in its fully retracted, FIG. 6, position, said leading connector 2 in the magazine 312 is pushed by the ram 258, from the magazine, through which the ram 258 passes, into an initial position in the guide 44; and that when the guide 44 is advanced to its partially retracted, FIG. 9 position (shown in broken lines in FIG. 32) the ram 296 enters the slot 48 of the guide 44 and drives the connector 2 therein to its fully inserted position in which the connector is shown in FIG. 10. The motor 308 is operated to locate said leading connector in alignment with the slot 48 at the beginning of each cycle of operation of the apparatus.

As shown in FIG. 25, the guide 44 projects from the carriage 62 towards the magazine holder 298, the facilitate transfer of the connector to the guide 44.

Figure 36:
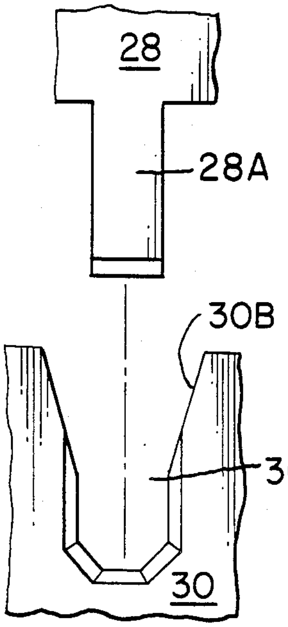
FIG. 36 is a fragmentary front view of a wire combing tool of the apparatus.
Figure 37:
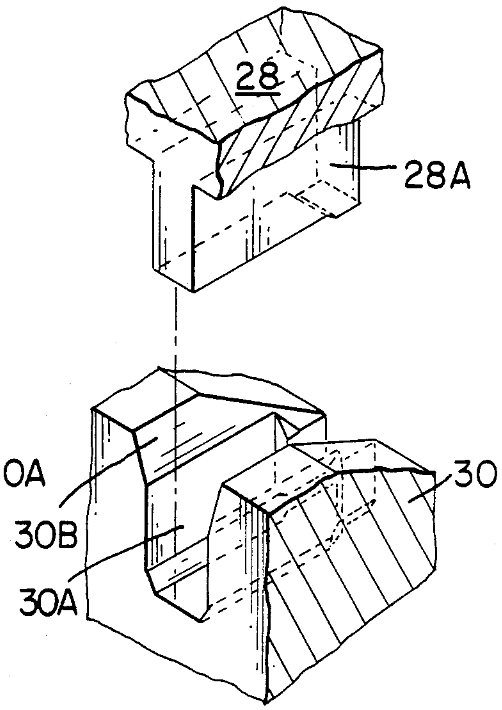
FIG. 37 is a fragmentary perspective view of the tool of FIG. 36.

The wire combing tools 28 and 30 are shown in detail in FIGS. 36 and 37. The tool 30 has a series of notches 30A each having a flared mouth 30B for receiving the stripped end portion of one of the cables 3, that is to say for receiving a signal wire with its insulation T thereon and the two accompanying ground wires G. As the tools 28 and 30 are closed about the cables C as shown in FIGS. 9, the stripped end portion of each cable C is guided into a respective notch 30A by the walls of the flared mouth 30B of the notch 30A. The tool 28 has a tooth 28A disposed opposite to each notch 30A. When the tools 28 and 30 have been closed about the cables C, the teeth 28A hold the stripped end portions thereof down in the notches 30A under very light pressure, so that as the closed tools 28 and 30 are retracted from the clamp 46, the wires of each cable are combed into parallel relationship as mentioned above with reference to FIG. 9.

Figure 38:
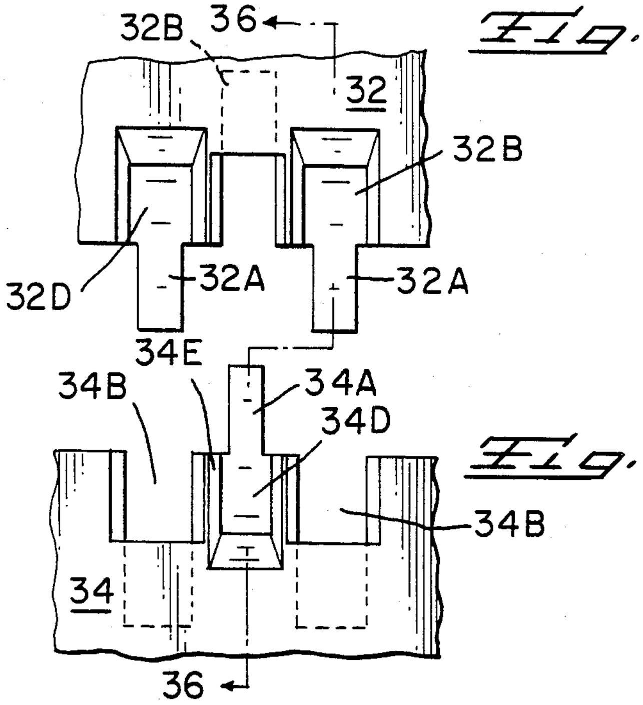
FIG. 38 is a fragmentary front view of a mask and deflector tool of the apparatus.
Figure 39:
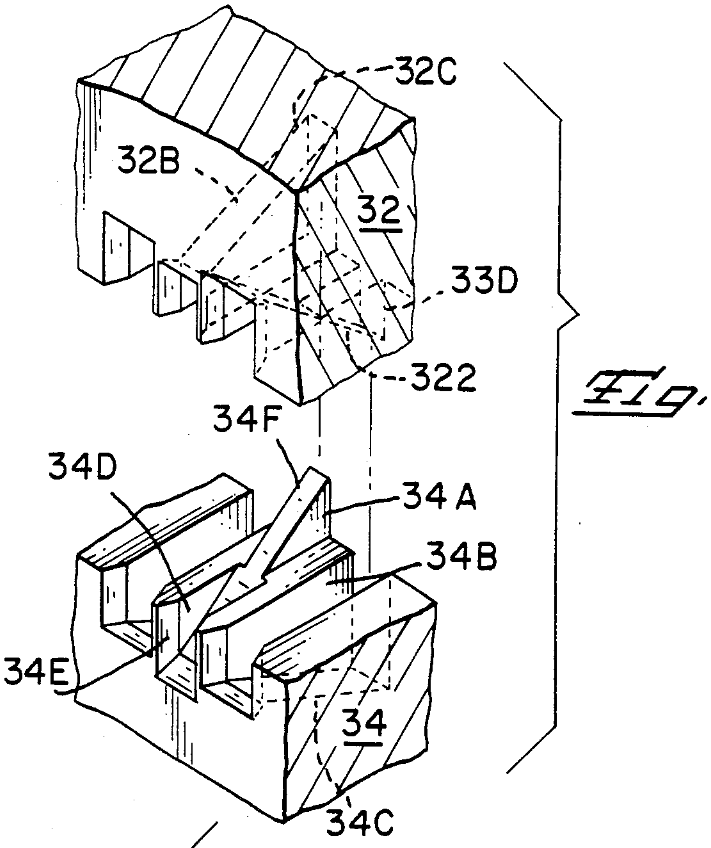
FIG. 39 is a fragmentary perspective view of the tool of FIG. 38.
Figure 40:
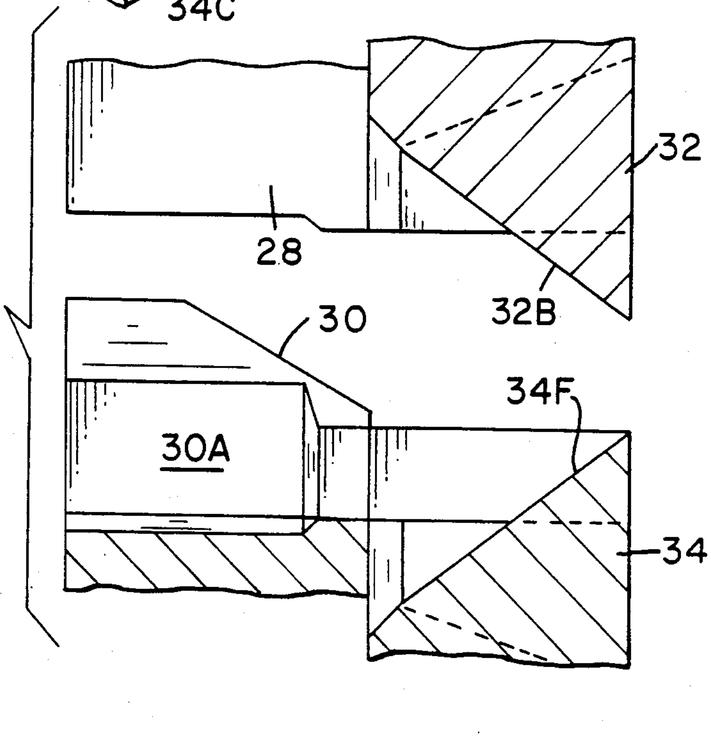
FIG. 40 is a cross-sectional view of the tool of FIGS. 38 and 39.

A part of each of the masking and deflection tools 32 and 34 is shown in FIGS. 38 and 39. For each stripped cable end, the tool 32 comprises a pair of teeth 32A having between them a recess 32B which, as best seen in FIG. 39, is substantially of triangular shape as seen in longitudinal section, and which tapers in the direction of the clamp 46, the base 32 C of the recess 32B being upwardly inclined. The teeth 32A each define a recess 32D which is also triangular as seen in longitudinal section, as best seen in FIG. 39 and which tapers away from the clamp 46, the base 32E of each recess 32D being downwardly inclined. The tool 34 has for each stripped cable end, a central, triangular tooth 34A having an inclined surface 34F and which is complimentary with an opposite recess 32B of the tool 32, and on either side of the tooth 34A a recess 34B having a floor 34C which is inclined downwardly and away from the clamp 46, each recess 34B being complimentary with the opposite tooth 32A. The tooth 34A cooperates with the walls of the recesses 34B to define a central recess 34D through which the inclined surface 34F extends. When the tools 32 and 34 are closed about the stripped cable end, as shown in FIG. 10, the ground wires G which have now been combed into parallelism with the signal wire S, are forced by the teeth 32 and 32A, down into the recesses 34B of the tool 34 so that each wire G is forced to follow the inclination of the floor 34C of the corresponding recess 34B and is thereby bent downwardly as shown in FIG. 12, as the carriage 62 is moved towards the clamp 46. The signal wire S enters the recess 34D, the end of the insulation T of the wire S engaging against abutments 34E defining a flared mouth of the recess 34D, so that as the carriage 62 is moved towards its FIG. 12 position, the insulation T of the wire S is progressively pushed back by the abutment surfaces 34E and the signal wire S is forced by cooperation between the inclined surfaces 32B and the inclined surface 34F of the tooth 34A to follow the contours of these surfaces so that the wire S is bent upwardly as shown in FIG. 12 and also in FIG. 3. The tools 32 and 34 are shown in cross section in FIG. 40.

We claim:

1. Apparatus for deploying juxtaposed wire end portions to locate said wire end portions in respective wire receiving channels of electrical contacts on opposite sides of an insulating electrical connector body, the apparatus comprising:

an elongate frame;

a carriage on the frame for movement longitudinally thereof and having a forward and a rear end;

a tooling assembly fixed to the forward end of the carriage adjacent to said supporting means and having movably mounted therein tools for combing the wire end portions into parallel relationship in a predetermined plane, and tools for deflecting the wire end portions from said plane so as to straddle said connector body when it is supported by said supporting means;

a slide mounted on said carriage for movement towards and away from the tooling assembly and having a forward end facing theretowards;

means connected to said forward end of the slide, for wiping each of the wire end portions into a respective one of said wire receiving channels and comprising wiper elements; and means for cyclically driving said carriage, said slide, said tools and said wiping means, to cause said tools to comb said wire end portions when positioned in front of said carriage and in alignment with said tooling assembly, into parallel relationship, to deflect said wire end portions so as to straddle said connector body and to cause said wiper elements of said wiping means to wipe said wire end portions into respective wire receiving channels of said contacts, said driving means comprising a drive unit mounted on said frame and being connected to said carriage for driving it longitudinally of said frame, first drive mechanisms mounted on said carriage and being connected to said wire combing and wire deflecting tools for driving them towards and away from said wire end portions, and a second drive mechanism mounted on said carriage and being connected to said wiping means for driving said wiper elements towards and away from said wire end portions.

2. Apparatus as claimed in claim 1, wherein means are provided in front of said carriage and of said tooling assembly for clamping a cable end in a fixed position with said wire end portions projecting from the clamping means towards said tooling assembly, the carriage being movable towards and away from said clamping means along a rectilinear path.

3. Apparatus as claimed in claim 1, wherein the tooling assembly comprises a pair of wire combing tools, and means connected to one of said first drive mechanisms for applying these tools simultaneously to the wire end portions in an advanced position of the carriage, said drive unit being actuable to then retract the carriage to cause the wire combing tols to comb the wire end portions.

4. Apparatus as claimed in claim 1, wherein the tooling assembly further comprises pilot tools slidably mounted therein for positioning said connector body with respect to said wiper elements, said pilot tools being mounted therein for movement towards and away from the connector body when it is supported by said supporting means.

5. Apparatus as claimed in claim 1, wherein said wiper elements comprise a pair of wipers mounted on said slide, means connected to said second drive mechanism for applying said wipers to the wire end portions in an advanced position of the slide towards the tooling assembly, and for then retracting the slide with the wipers engaging the wire end portions, to wipe the wire end portions into said channels.

6. Apparatus as claimed in claim 1, wherein said supporting means comprises a connector guide structure defining a connector receiving slot opening in a first direction towards said tooling assembly and in a second, orthogonal, direction to receive a connector body guide channel, a connector body storage magazine being mounted on a frame beside said carriage, means being provided on said frame and beside said carriage for feeding connector bodies along said guide channel and into said slot from said magazine.

7. Apparatus as claimed in claim 6, wherein said guide channel is attached to said guide structure and is aligned with said magazine in a first position of said carriage, a first ram mounted on said frame beside said carriage and being movable towards said magazine to drive a connector body from said magazine into said guide channel in said first position of said carriage, a second ram mounted on said frame beside the carriage and beside the first ram being movable towards said carriage to drive the connector body from said guide channel into said slot, in a second position of said carriage.

8. Apparatus as claimed in claim 1, wherein said tooling assembly comprises a frame having slidable mounted therein, a pair of masking and deflection tools movable between an open position and a closed, wire end portion receiving position, the masking and deflection tools being provided with recesses for receiving the wire end portions and wire end portion deflecting teeth engageable in the recesses, at least one of the recesses having surfaces for engaging the insulation of an insulated wire end portion, the tools being movable by forward movement of the carriage by means of said drive unit, in their closed position to receive the wire end portions in the recesses, to push back the insulation of the insulated wire end portion, and to deflect the wire end portions by cooperation between said teeth and walls of said recesses.

9. Apparatus as claimed in claim 1, wherein the wiper elements comprises a pair of wipers pivotally attached to the connector body supporting means and which are movable towards and away from one another by means of a further slide mounted on the carriage for movement between the wipers.

10. Apparatus as claimed in claim 1, wherein said driving mechanisms comprise a cam shaft on said carriage, a first cam thereon acting upon a first linkage for advancing and retracting said slide; a second cam on said shaft acting upon a second linkage connected to a further slide for opening and closing said wiper elements; a third cam on said shaft acting upon a linkage connected to said tools for retracting said insulation and deflecting said wire end portions; and a fourth cam on said shaft acting upon a linkage connected to said combing tools.

11. Apparatus for deploying juxtaposed end portions of an insulated signal wire and ground wires, to locate said wire end portions in respective wire receiving channels in electrical contacts fixed to opposite sides of an insulating electrical connector body, the apparatus comprising:

a frame;

a carriage mounted on the frame for reciprocating movement along a rectilinear path, the carriage having a forward end and a rear end, spaced longitudinally of said path;

a tooling assembly secured to the forward end of said carriage;

a connector body support disposed on said carriage rearwardly of said tooling assembly;

tooling arranged in said tooling assembly, for combing the wire end portions into parallel relationship, for pushing back the insulation from the end of the signal wire end portion and for deflecting the combed wires in opposite directions to straddle a connector body when supported by said support;

wiper means mounted on said carriage for reciprocating movement towards and away from said tooling assembly, to wipe the deflected wire end portions into said wire receiving channels; and means for cyclically actuating said carriage, said tooling and said wiper means whereby, said wire end portions when supported in alignment with said tooling are combed into parallel relationship, the insulation is pushed back from the end of the signal wire end portion and the wire end portions are deflected in said opposite directions, and the deflected wire end portions are wiped into said wire receiving channels by said wiping means, said actuating means comprising a drive unit mounted on said frame and being connected to said carriage for driving it in said reciprocating movement, first drive mechanisms mounted on said carriage and being connected to said tooling to drive tools thereof towards and away from said wire end portions, and a second drive mechanism mounted on said carriage and being connected to said wiper means for driving said wiper means towards and away from said wire end portions.

12. Apparatus as claimed in claim 11, wherein said tooling assembly comprises a framework having slidably mounted thereon a pair of wire combing tools which are movable towards and away from one another, a pair of mask and deflector tools slidably mounted in the framework beside said combing tools for movement towards and away from one another, one of said first drive mechanisms being connected to the combing tools for moving the combing tools into engagement with said wire end portions in a forward position of the carriage and said drive unit being actuable for subsequently retracting the carriage so that the combing tools comb the wire end portions into parallel relationship, another of said first drive mechanisms being connected to said mask and deflector tools for subsequently closing the mask and deflector tools, a ram being provided on said frame and beside said carriage for feeding a connector body into said support said drive unit then being actuable for advancing the carriage to cause the masking and deflector tools to push back the insulation of said signal wire end portion and to deflect said wires in said opposite directions, and said second drive mechanism being actuable for advancing said wiping means to engage the deflected wire end portions, and for subsequently retracting said wiping means to locate said wire end portions in said wire receiving channels.

13. apparatus as claimed in claim 12, wherein said framework further has slidably mounted therein a pair of pilot tools movable towards and away from one another a third drive mechanism mounted on the carriage and connected to said pilot tools being provided for moving said pilot tools towards one another to support a portion of said connector body projecting from said support, prior to said forward movement of the carriage.

14. Apparatus as claimed in claim 11, wherein said tooling comprises upper and lower combing tools, upper and lower mask and deflector tools, and upper and lower pilot tools slidably mounted in juxtaposed relationship for reciprocating movement in a framework of said tooling assembly, the upper and lower combing tools and the upper and lower mask and deflector tools being driven by means of a first rocker arm and the upper and lower pilot tools being driven by means of a second rocker arm, said rocker arms being pivotally attached to said carriage, the first rocker arm having a first end connected to a first camming slide engaging a cam follower connected to said upper combing and mask and deflector tools and a second end connected to a second camming slide engaging a cam follower connected to said lower combing and mask and deflector tools, the second rocker arm having a first end connected to a third camming slide engaging a cam follower connected to said upper pilot tool and a second end connected to a fourth camming slide engaging a cam follower connected to said lower pilot tool.

15. Apparatus as claimed in claim 11, wherein said combing means comprises a pair of combs mounted on a common pivot pin which is slidably mounted in said connector body support for movement towards and away from said tooling assembly, a first slide connected to said pivot pin and being actuable to move said pivot pin towards and away from said tooling assembly, a cam follower on each said comb, a second slide having cam surfaces engagable with said cam followers, one of said first drive mechanisms being connected to said second slide for moving the second slide towards and away from said framework to move said combs towards and away from one another.

16. Apparatus as claimed in claim 15, wherein said first and second slides extend in superposed relationship into a cam housing on said carriage, said second slide having a cam follower engaging a cam suface of a third slide extending transversely of said first and second slides, for driving said second slide, the first slide and the third slide being driven by way of a common cam shaft on the carriage.

17. Apparatus as claimed in claim 16, wherein said cam shaft is drivingly coupled to a first drive shaft which is in turn drivingly coupled to said tooling for pushing back the insulation from the end of said signal wire end portion and for deflecting said wire end portions, and to a second drive shaft drivingly coupled to pilot tools for aligning said connector body in said connector body support, one of said first and second drive shafts being arranged concentrically within the other.

18. Apparatus according to claim 11, wherein said tooling for pushing back the insulation from the end of said signal wire end portion and for deflecting the combed wires, comprises first and second tools mounted in a framework of said tooling assembly for movement towards and away from each other, said first and second tools having respective teeth which are interengagable to define a central wire deflecting passage extending upwardly in a direction towards said connector body support and on either side of said first passage, a second passage extending downwardly towards said connector support, the first passage having at its end remote from the connector body support, bearing surfaces for engaging the insulation of said signal wire end portion to push back the insulation thereof upon forward movement of the carriage.

19. Apparatus as claimed in claim 12, wherein a connector body feed mechanism mounted beside the carriage, is arranged to feed a connector body towards said connector support in a rearward position of the carriage and to feed said body into said support in an intermediate position of the carriage and onto a pilot tool of said tooling assembly prior to further forward movement of the carriage.

20. A method of deploying juxtaposed wire end portions at least one of which is insulated to locate said wire end portions in respective wire receiving channels of electrical contacts on opposite sides of an insulating electrical connector body, the method comprising the steps of:

applying combing tools to the wire end portions;

bringing about relative movement between the combing tools and the wire end portions to comb the wire end portions into parallel relationship;

locating the connector body in alignment with the wire end portions at a position spaced from their ends;

passing the wire end portions between a series of wire deflecting surfaces extending between the ends of the wire end portions and said connector body, to push back the insulation of said insulated wire from the end of said end portion thereof and to located a wire end portion on one side of said body and in register with a wire receiving channel of an electrical contact thereon, and to locate another of the wire end portions on said opposite side of said connector body and in register with a wire receiving channel of an electrical contact thereon;

withdrawing said wire deflecting surfaces from said wire end portions; and wiping said wire end portions into the wire deflecting channels with which they are in register.

* * * * *